United States Patent Office 3,730,884
Patented May 1, 1973

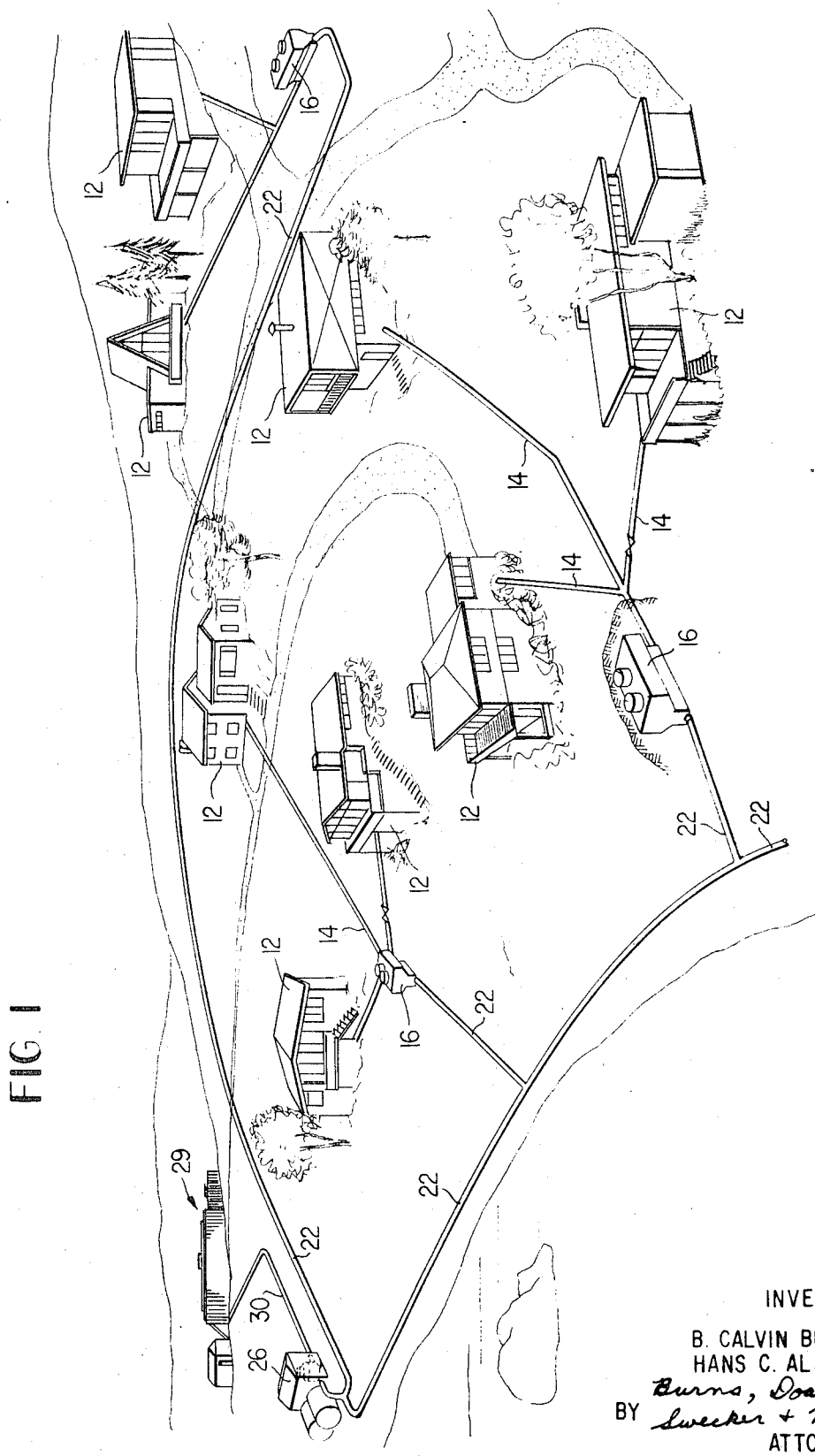

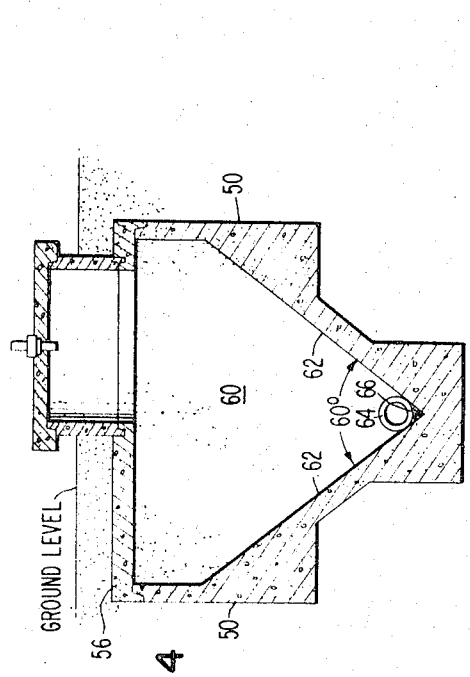
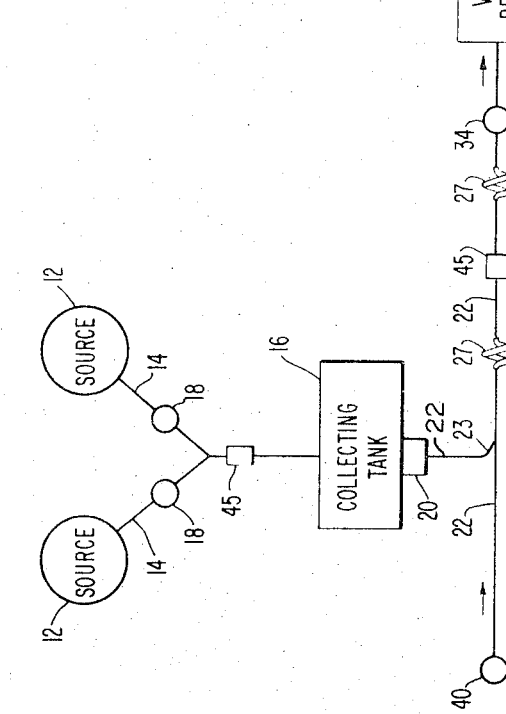
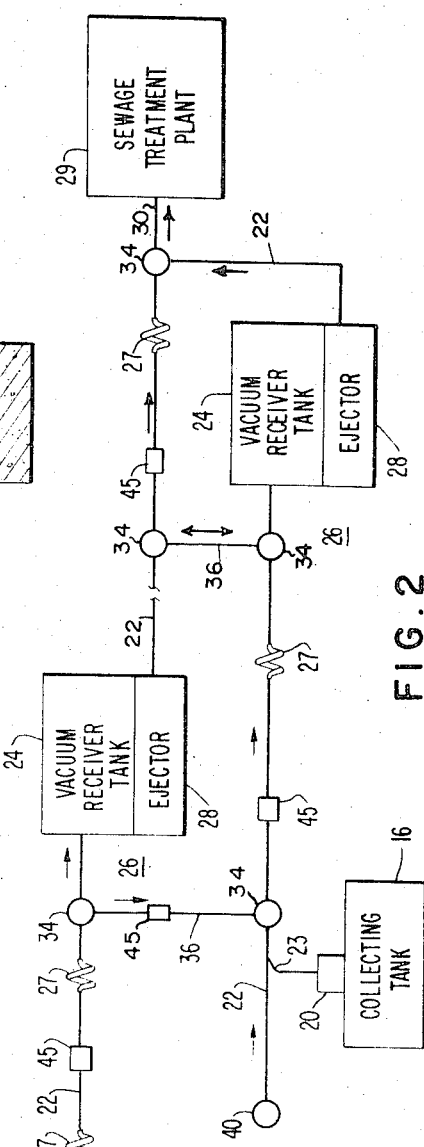
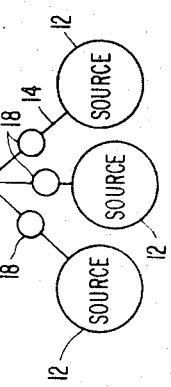
FIG. 4
FIG. 2

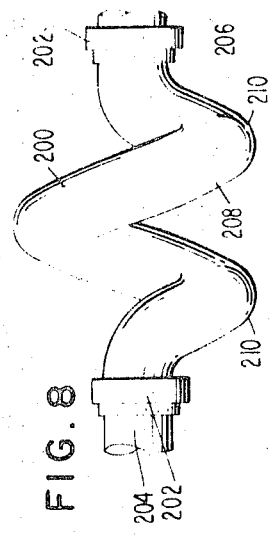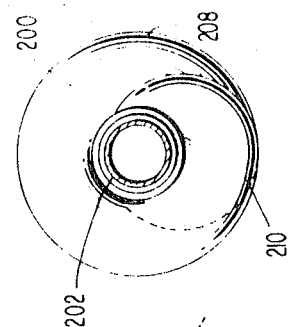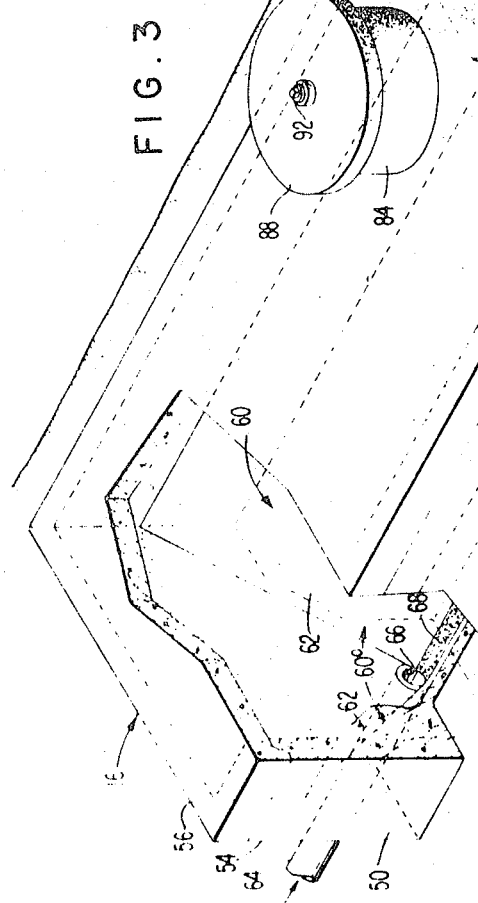

3,730,884
METHOD AND APPARATUS FOR CONVEYING SEWAGE
Bland Calvin Burns, P.O. Box 254, Woodbridge, Va. 22191, and Hans C. Albertsen, 105 Spring Valley Drive, Annapolis, Md. 21403
Continuation of application Ser. No. 16,734, Mar. 5, 1970, which is a continuation-in-part of application Ser. No. 767,626, Oct. 15, 1968, both now abandoned. This application Apr. 2, 1971, Ser. No. 130,791
Int. Cl. C02c 1/00
U.S. Cl. 210—15
48 Claims

ABSTRACT OF THE DISCLOSURE

A method and apparatus for conveying sewage from sewage sources such as residences to a remote location, the sewage initially being conveyed by gravity flow from the source into a collecting tank and thereafter by vacuum induced plug flow to a vacuum receiver tank at the remote location. The sewage may thereafter be discharged from the remote location, preferably under positive pressure, into another line such as a vacuum line for further vacuum induced plug flow or a gravity flow conduit. The final location to which the sewage is conveyed may be the sewage treatment facility. Substances for treating the sewage may be advantageously introduced into the system and mixed with the sewage during conveyance. Self-scouring tanks, rotation imparting plug reformers, and several alternative ways of introducing controlled amounts of air at or above atmospheric pressure into the vacuum portion of the system are provided.

RELATED APPLICATIONS

The present application is a continuation of application Ser. No. 16,734, filed on Mar. 5, 1970 which in turn was filed as a continuation-in-part of application Ser. No. 767,626, filed on Oct. 15, 1968, both applications being now abandoned.

BACKGROUND OF THE INVENTION

The present invention relates basically to a method and to the apparatus associated therewith for conveying sewage from a sewage source to a remote location by the use of both gravity flow and vacuum induced plug flow.

Sewage, as the term is hereinafter used, is defined as the liquid waste of a community and comprises the liquids of various natures containing dissolved, suspended and floating solids as discharged from toilets, baths, sinks and other plumbing fixtures in residences, office buildings and the like as well as the waste products of manufacturing or industrial plants and processes. The solid matter in such a liquid, while ordinarily quite small with respect to the total volume of the liquid, is commonly of such a highly putrescible nature that a severe health hazard is created unless the entire volume of sewage is promptly and efficiently conveyed away from the source to a sewage treatment plant for purification. For example, most sewage readily becomes septic unless treated within about 4 to 6 hours. The problem of prompt removal of sewage is particularly acute when relatively small volumes of sewage are involved, as in the conventionally used gravity flow system small volumes cannot be promptly and efficiently transported.

Typically, sewage is admitted from the various points of origin, i.e., sewage sources, into a system of conduits. Such a system may include house connections, laterals, branch and main sewers, trunk sewers, interceptor and outfall sewers and the like which serve to contain and convey the sewage from its point of origin to its ultimate destination at the sewage treatment plant. As mentioned above, the sewage is conventionally conveyed through a system of this type solely by the force of gravity acting on the mass of sewage.

Since the flow of sewage through the various conduits in the system is maintained by the force of gravity, the design of conventional systems is limited to a large extent by the natural topography of the community in which the system is installed. The routing and the sizing of the conduits are dictated to a large extent by the necessity for maintaining a sufficient rate of descent for a conduit of a given size. As a practical consideration over level terrain, the depth at which the conduits must be laid will increase progressively toward the sewage treatment plant in order to maintain certain minimum gradients through the system.

Moreover, relatively large pipes must be utilized to handle the large liquid volume at the low rate of descent normally available. The cost of laying the conduits is thus a nonlinear function of the size of the sewer due to the cost of the conduit and the more extensive excavation and backfill necessitated by the increased size. The cost of the system is, moreover, vastly increased where water, rock or unstable ground conditions are encountered and blasting, tunneling, shoring, de-watering, pipe encasement and the like is required.

In conventional systems, underground pipes or conduits must be designed and initially installed for a maximum development of the geographical area to be serviced. Where vacation or second home developments are involved, practical problems arise because hook-ups of the homes into the system may be initially quite few and the use of the system may be seasonal and likely be intermittent over an initial period of a year or more.

The conduits are conventionally made of vitrified clay, concrete or the like due to the prohibitive cost of metallic or plastic pipe of the diameter required. Such conduit must, however, be manufactured in short lengths due to the relatively low tensile strength of the materials. This in turn necessitates an extremely large number of conduit joints thereby resulting in infiltration during rainy seasons and the overloading of sewage treatment plant facilities. Conduit joints also allow easy entry of roots which obstruct flow and which may allow the area to be contaminated due to leakage of the sewage.

Because of such obstructions, it is a common practice in the conventional gravity flow system to require the installation of manholes at frequent intervals to permit inspection and the insertion of devices designed to remove the roots, silt deposits and other obstructions. Each manhole installation is, of course, an additional and substantial cost factor, and the manholes themselves are openings through which undesirable foreign matter can, and frequently does, enter the sewer system.

For these reasons it is the conventional practice to maintain a 10 foot horizontal separation between the gravity flow sewer pipes and water pipes. Consequently, separate trenches are customarily required.

In an effort to overcome some of the aforementioned deficiencies of the gravity flow sewerage systems of the type described, the use of vacuum sewerage systems has been suggested, for example, in United States Letters Patents 3,239,849 and 3,115,148 to Liljendahl. In systems of this general type, water wastes are separately conveyed by gravity through a conventional gravity flow system. The solids, however, including those having a highly putrescible nature i.e., the waste from water closets and the like, are conveyed in plug form through pipes or conduits in a separate vacuum system by means of pneumatic pressure to a separate collecting tank. The diameter of the pipes or conduits of the vacuum system must, according to Liljendahl, be no greater than 2½ inches inner diameter. Such substantially solid sewage may be conveyed in these small diameter conduits in plug form when the sewage substantially fills the entire cross-sectional area of at least a portion of the conduit to form a plug and a pressure differential is created on opposite sides of the plug of sewage. This pressure differential is created by means of a vacuum in the tank into which the sewage is to be drawn, i.e., the receiver tank, and the admission of air at atmospheric pressure into the pipe or conduit behind the sewage plug. Such a conveyance system or method is sometimes hereinafter referred to simply as vacuum induced plug flow or vacuum plug flow.

As discussed in the above mentioned United States Pat. No. 3,239,849, the plugs may break down before reaching the receiver tank due to the distance and frictional forces. However, the plugs may be reformed by the use of so-called plug reformers subsequently more fully discussed.

To date, however, no system is generally known whereby all forms of sewage including waste fluids such as water can practically and economically be conveyed in the same conduit from the sewage source to a sewage treatment plant other than the conventional gravity flow system.

Accordingly, the primary object of the present invention is to provide a novel method and the equipment or apparatus associated therewith for transporting sewage, which method and apparatus are especially adapted to handle large volumes of both liquids and solids in a single conduit or pipe and, which, moreover, is adapted for efficient operation not only at full capacity, but also when only a few widely spaced sources are connected.

Another object of the present invention is to provide a novel sewer system for both liquids and solids employing conduits having a materially increased diameter as compared to the prior art vacuum plug flow systems, whereby a significant cost reduction is achieved.

Still another object of the present invention is to provide a novel system in which sewage is conveyed, under the influence of gravity, from a plurality of sewage sources, i.e., homes or buildings having conventional plumbing fixtures, into a collecting tank; then conveyed, by the creation of a subatmospheric pressure in a downstream vacuum receiver tank at a transfer station, from the collecting tank into the vacuum receiver tank in the form of coherent plugs; and then conveyed through subsequent transfer stations to the sewage treatment plant in the form of coherent plugs under an increased differential resulting from the creation of a superatmospheric pressure in the forwarding conduit of each transfer station.

In the prior art vacuum induced plug flow system of Pat. No. 3,239,849, the vacuum system operates with such a small amount of water that it cannot be connected into a conventional gravity flow system without special provision for additional water to scour the walls of the conduits.

Yet another object of the present invention is to provide a novel collecting system for each sewage source, i.e., house, office building and the like, which obviates the foregoing disadvantages.

Yet still another object is to provide a system in which the sewage may be conveyed through the subsequent transfer stations as earlier described and thereafter introduced into a conventional gravity flow system for conveyance to the sewage treatment plant. The system of the present invention may thus be utilized at a great financial savings in the development of areas heretofore impossible to serve by discharging into an existing conventional gravity flow system remote from the sewage treatment facility.

Plug reformers have been utilized in the prior art vacuum induced plug flow systems to assist in the reformation of coherent plugs. As is well known, the plug of sewage gradually loses its coherence and breaks down at the leading and trailing edges thereof due to gravity and the frictional engagement with the internal walls of the conduit thereby allowing the propelling air to pass over the sewage along the conduit to the vacuum source. The plug formers, or more aptly plug reformers, of the prior art conventionally consist of a U-shaped depression in the conduit or may take the form of a single downward circular turn of the conduit in the vertical plane thereof.

Accordingly, a further object of the present invention is to provide a novel plug forming or reforming apparatus in which rotation is imparted to the plug of sewage as it is propelled from the plug reformer. The rotation of the plug of sewage retards the breakdown and thus not only increases the efficiency of the system but reduces the number of required plug reformers as well. In addition to the labor and material savings thus achieved, the efficiency and longevity of the overall system is boosted by the scouring of the lower portions of the conduit where the solids tend to settle.

Since one of the prime concerns in conveying sewage is the time that the sewage remains in the system and the increased septicity which results therefrom, it a further object of the present invention to provide a novel method and apparatus for the comminution and aeration of the sewage while it is being conveyed through the system. Additional provision for the introduction of treatment substances into the vacuum conduit to be swept throughout the system and thoroughly mixed with the sewage in the comminution process described may also be made.

A still further object of the present invention is to provide a novel self-cleaning or self-scouring sewage collecting tank, and an automatic control system therefor which is operative either on override command from a remote station or periodically and/or automatically in response to the volume of sewage in the collecting tank for causing the collection tank to be emptied into the vacuum induced plug flow system.

Yet still a further object is to provide a novel sewage rate of flow control system in which the peak flow is rounded off to keep the average flow more nearly constant. Sufficient delay may thereby be introduced in emptying the collecting tanks to average out the customary heavy usage at breakfast and dinner times which exceeds the average usage by a factor of from 2 to 4. The status of a large number of collecting and vacuum receiver tanks at the transfer stations of the present system may be remotely monitored and corrective action automatically or manually initiated. Corrective action might, for example, constitute the emptying of a collecting tank on a Monday morning in a vacation development to prevent septic action when the collection in a particular tank has an insufficient volume of sewage to empty automatically. Means for cycle monitoring may be employed to insure release of controlled amounts of sewage from sparsely populated areas even though the system is actually designed for a much larger ultimate capacity.

Yet a still further object of the present invention is to provide a novel control system for monitoring and controlling the various valve conditions as well as the pressure and sewage levels throughout the system.

Further, the effectiveness of the sewage treatment plant is increased by the controlled introduction of air at various points in the system by the pulverization or comminution of the sewage due to high velocity of transfer in the vacuum lines, by a reduction in the time that raw sewage is retained in the piping system, by the controlled averaging of fluid flow, and finally by keeping fluids due to infiltration out of the sewer pipes during rainy seasons. Important reductions in the size and cost of the sewage treatment plant facilities are thus effected.

The system of the present invention also allows for partial construction whereby the legal per unit requirements may be met in a new development where only a few homes are completed, rather than having to comply with the ultimate full sewage requirements of the development during the initial construction phases. Emergency procedures allow for not only auxiliary standby power, but for duplicate equipment at certain locations at a modest cost. Portable auxiliary equipment may also be easily provided by truck.

Additionally, the vacuum conduits of the system of the present invention may be laid in the same trench and at the same time as the water pipes without fear of leakage and contamination and thus provide a substantial additional reduction in labor costs.

These and other advantages and objects will be readily apparent to one skilled in the art to which the invention pertains from the claims and from a reading of the following detailed description of a preferred embodiment in conjunction with the appended drawings.

THE DRAWINGS

FIG. 1 is a pictorial representation of the system of the present invention;

FIG. 2 is a schematic block diagram of the method for conveying sewage of the present invention;

FIG. 3 is a perspective drawing in partial section of one embodiment of the novel self-cleaning collecting tank adapted for use in the system of the present invention for servicing a cluster of up to half-dozen houses;

FIG. 4 is a vertical section taken through line 4—4 of FIG. 3, showing the cross-sectional configuration of the sewage collection region of the collecting tank;

FIG. 7 is an axial end view of one embodiment of a novel plug reformer of the present invention;

FIG. 8 is a side view of the plug reformer of FIG. 7;

FIG. 9 is an axial end view of a second embodiment of the plug reformer of the present invention;

FIG. 10 is a side view of the plug reformer of FIG. 9;

THE DETAILED DESCRIPTION

Figure 5:
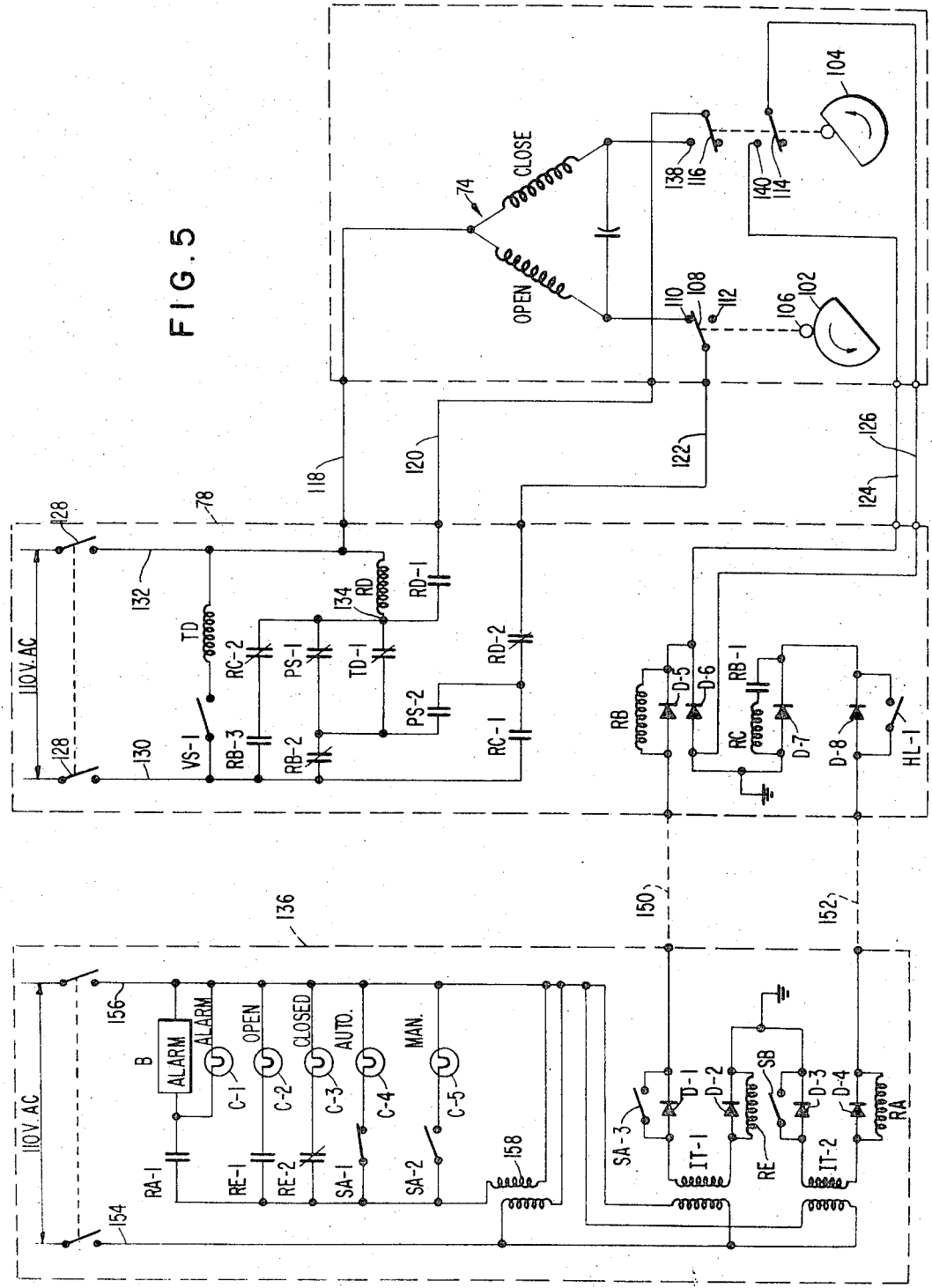
FIG. 5 is a wiring diagram of a control system operable to periodically empty the collecting tank of FIG. 3.

An understanding of the sewage conveyance system of the present invention may be facilitated by a general description of the overall system followed by a more detailed description of the preferred embodiments as set out in accordance with the following table of contents:

TABLE OF CONTENTS (I) The overall system
(II) The collecting tank
(III) The transfer station
(IV) The plug reformer
(V) The Y connections
(VI) The control panel
(VII) An alternative vacuum system

(I) The overall system

An understanding of the present invention may be more easily obtained from an explanation in the context of a lakefront vacation community. For example, and with reference to FIG. 1, sewage from a plurality of sources 12, all vacation homes spaced along the lakefront in the present example, is gravity fed through conventional gravity flow conduits or lines 14 into sewage collecting tanks 16. As illustrated, each of the collecting tanks 16 may receive the sewage from 2 to 4 homes, or more.

Periodically, or when the sewage in the collecting tanks reaches a predetermined level, the sewage from each of the collecting tanks 16 is discharged into a vacuum line 22 through which it is conveyed in plug form to an ejector or transfer station 26. A pneumatic ejector may then be utilized to propel the sewage through a main 30 to the central sewage treatment plant 29.

By using the system of the present invention, the sewage lines can be laid with little regard to terrain as they need only be buried below the frost line. Moreover, fluctuating loads, caused by intermittent use of the vacation homes, will have little or no effect on the operation of the system and widely spaced houses can be handled efficiently from the very outset of development.

In the illustrated example, the installation of a conventional gravity system would require installing the mains along the lakefront thus scarring the development's most valuable property. Lines would have to be laid as much as 20 feet below the street level since the roads would be laid out to follow the topography, and the infrequent use of the vacation homes would present substantial operating difficulties.

With the preceding overview, an operational embodiment is more easily understood and is illustrated in the schematic block diagram of FIG. 2. With reference to FIG. 2, sewage is conveyed by gravity flow in a conventional gravity flow conduit or line 14 into a sewage collecting tank 16 from a sewage source 12 such as a home, apartment, office building and the like having conventional plumbing and toilet fixtures. Several sources 12 and lines 14 are illustrated. A conventional one way or check valve 18 may be positioned in the gravity conduit 14 as is shown in FIG. 2 to prevent the back-up or return of sewage into the source 12 once it has entered the line 14.

The sewage from the various sources 12 associated with each of the collecting tanks 16 is collected until it reaches a certain predetermined level at which time a valve 20 is opened. This valve 20 is hereinafter referred to as a vacuum valve and is subsequently more fully described with reference to FIGS. 3 and 4 of the drawings. The vacuum valve 20 is in fluid communication with the collecting tank 16 such that when the valve 20 is opened, the sewage flows from the tank 16 through the valve 20 into the vacuum line 22 which may include one or more of the Y connections 23 described infra in connection with FIG. 11. The sewage is in plug form and is conveyed to a transfer or ejector station 26 hereinafter more fully described with reference to FIG. 6 of the drawings.

The conveyance of the sewage in plug form is effected by the pressure differential existing between the vacuum receiver tank 24 at the transfer station 26, and the pressure of the air on the other side of the sewage plug, i.e., initially the pressure of the air at the collecting tank 16. This air may be supplemented at various points in the system in a manner subsequently discussed.

It is important to note that the vacuum receiver tank 24 at the transfer station 26 is always maintained at a subatmospheric pressure, preferably at about ¼ to ½ that of the atmosphere. This, in turn, creates a vacuum in the line 22 which is in fluid communication with the receiver tank 24. The pressure in the collecting tank 16 must, of course, be greater than that in the vacuum line 22 and is conveniently that of the atmosphere except for the increase in pressure which occurs with the collection of sewage in the tank 16 as is hereinafter more fully discussed. However, any greater pressure may be used if desired.

As previously mentioned, conveyance of a material in plug form necessitates that a pressure differential exist across a plug coherent for at least a short distance. The momentum gained will carry the sewage downstream for some distance after breakdown of the coherent plug. Heretofore, the formation of such a coherent plug was believed to require the use of an inner pipe diameter no greater than 2½ inches and was believed to be useable with substantially solid materials only, i.e., a minimum of water or other liquids. The mode of operation in the prior art vacuum systems was thus short plugs of a small volume of substantially solid material. It has been found, however, that larger diameter pipes may be used to convey the total sewage effluent, both solids and liquids, and that this total effluent may be conveyed in the same relatively larger diameter conduit by vacuum induced plug flow.

The valve 20 must remain open for a period of time sufficient to allow a volume of air at a pressure higher than that in the tank 24, preferably atmospheric pressure, to pass through the vacuum valve 20 into the vacuum line 22 behind the plug of sewage from the collecting tank 16. The valve 20 of the present invention is kept open for a variable period depending on varying static and hydraulic conditions, typically less than one minute. For example, the valve 20 may remain open for about 5 to 30 seconds, preferably 10 to 25 seconds, following the passage of a 100 gallon plug of sewage through a 4 inch diameter pipe.

Normally, the distance between the collecting tank 16 and the vacuum receiver tank 24 at the transfer station 26 is such that the plug will break up for the reasons earlier mentioned before it reaches the tank 24. Hence, plug reformers 27, preferably of the type described infra in connection with FIGS. 7–10, are positioned at appropriate locations in the vacuum line 22. The locations for the plug reformers 27 may easily be determined by one skilled in the art through simple calculations based primarily on the pressure differential and the terrain.

As much as 100 gallons or more of sewage may typically be collected in a particular collecting tank 16 before the operation of vacuum valve 20 is initiated, i.e., opened to empty and to convey the entire contents of the collecting tank 16 therefrom. If desired, however, the automatic controls hereinafter described may be set to open the vacuum valve 20 when a lesser or greater volume of sewage has been collected.

The operation of the vacuum valve 20 may additionally or alternatively be periodic thereby providing a means for promptly conveying sewage away from the residential areas. The valve 20 may, of course, be opened any time for any time period upon an overriding manually initiated command. In any event, the collecting tanks 16 and vacuum lines 22 should be emptied before the sewage becomes septic. A conventional gravity flow system cannot practically achieve such a result, particularly in resort areas where the occupancy density undergoes great fluctuation, and where periods of substantially no use for several successive days, weeks or even months exist on a regular and recurring basis.

A number of transfer or ejector stations 26 may be installed between a given collecting tank 16 and the final sewage treatment plant 29 in the system according to a typical aspect of this invention. Accordingly, and with continued reference to FIG. 2, the sewage at the transfer station 26 is normally passed from the vacuum receiver tank 24 into an ejector 28 from which the sewage may be propelled by air at a superatmospheric pressure through the vacuum lines 22 and 30 to another transfer station 26 or the sewage treatment plant 29. An even greater pressure differential may thus be established than when only atmospheric pressure alone acts on the rearward side of the sewage plug.

When the terrain permits, the sewage may be ejected into any conventional type conduit such as a force main or gravity flow line to be transported to the sewage treatment plant. If necessary, however, a vacuum receiver tank 24 may be physically located at the sewage treatment plant 29.

The sewage in the vacuum line 22 may, of course, be diverted from one ejector station 26 to another in the event of a malfunction or in the event the load on the system is reduced allowing a single ejector station to service a greater length of line 22. The diversion may be accomplished in a conventional manner by means of conventional valves 34 and the connecting lines 36. Individual ejector stations 26 may thereby be periodically taken off-line for routine maintenance and repair, and tremendous flexibility is thus provided for the emergency handling of sewage in the larger installations.

As shown in FIG. 2, the ends of the vacuum lines 22 may be provided with valves 40 into which air and/or chemicals may be introduced. The valves 40 may be conventional in structure and operation and may, for example, be of the type described in connection with FIGS. 13 and 14.

Figure 13:
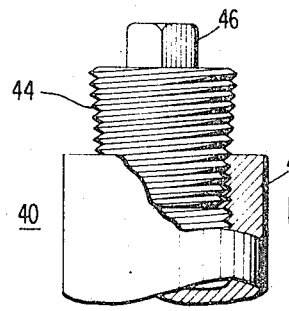
FIG. 13 is a side view of one embodiment of the air bleed valve of the present invention with a portion thereof broken away.

With reference now to FIG. 13 on sheet 6 of the drawings, the valve 40 may simply comprise an internally threaded cylinder 42 and a tapered threaded plug 44 whose axial position relative to the cylinder 42 may be longitudinally adjusted by means of an integral nut 46 to control the admission of air into the vacuum line 22 between the external threads of the plug 44 and the internal threads of the cylinder 42. The admission of air into the vacuum line assists not only in the conveyance of the sewage, but is of particular importance in the comminution and aeration of the sewage as will be subsequently explained.

With continued reference to FIG. 2 on sheet 2 of the drawings, several pressure clean out valves 45 may be strategically placed in the lines 14, 22, 30 and 36. These pressure clean out valves 45 may be conventional in construction and operation and may be, for example, of the type described in connection with FIG. 14. The function of the valves 45 is to provide a point where a source of positive pressure, for example, a truck mounted air compressor, may be connected into the lines to assist in their flushing. Other liquids, such as water with or without chlorine may be used, as may other desired sewage treatment or pH stabilization substances. These sewage treatment substances will be swept forward throughout the system at high velocity and thoroughly mixed with the sewage in its comminuted form.

Figure 14:
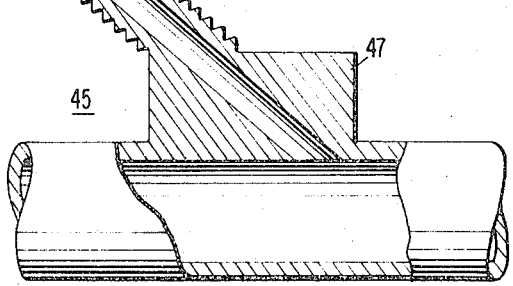
FIG. 14 is a side view of the pressure clean out valve of the present invention with a portion thereof broken away.

Referring now to FIG. 14 on sheet 6 of the drawings where one embodiment of a pressure clean out valve 45 is illustrated, a longitudinal section of conduit 47 may be connected into one of the lines. Extending upwardly and rearwardly from the housing atop the conduit 47 may be an externally threaded pipe 48 to which an internally threaded cap 49 may be secured.

To introduce air under a positive pressure into the line, it is necessary to remove the cap 49 from the pipe 48 and to threadably attach the end of a hose or other apparatus (not shown). The hose or pipe 48 may be valved as desired and the other end of the hose may be attached to any convenient, conventional source of air under pressure such as the accumulator tank of a truck mounted air compressor. Alternatively, of course, the other end of the hose may be attached to a source of sewage treatment substances. Although not necessary, it has been found helpful to introduce these substances at an obtuse angle to the axis of the line as illustrated.

The functions of the air bleed valve 40 of FIG. 13 and the pressure clean out valve 45 of FIG. 14 may be combined in a single structure where desired by internally threading the pipe 48 of the pressure clean out valve 45 and replacing the cap 49 with a tapered plug 44 of the type illustrated in FIG. 13. Alternatively, the internally threaded cap 49 or the externally threaded pipe 48 may be appropriately tapered to achieve the desired result.

The air bleed valve 40, or the clean out valve 45 when performing the same function, may, of course, be electrically or hydraulically activated and remotely controlled. In this manner additional air at atomspheric or greater pressure may be added automatically or as desired in predetermined amounts at predetermined locations to assist in the conveyance of the sewage through the vacuum lines 22, 30 and 36.

One of the features of the present invention is the ability to convey efficiently a large variation in the quantity of sewage effluent in one line. The vacuum lines typically have a diameter of from about 4 to 6 inches and may be constructed of any suitable material, preferably a suitable plastic such as polyvinylchloride. The system can handle the sewage from one house only, or from a community, without change until the maximum capacity of the line is reached. Rather than using larger diameter pipes in large communities, two or more plastic lines may be laid in the trench side by side when the sewer line is initially installed, and the second line placed in operation only when the capacity of the first line is exceeded.

The lines may thus be easily laid and need normally be no deeper than just below the frost line, or about 3 feet in most northern areas. The contour of the terrain may be almost completely disregarded, permitting areas including beach property now characterized as being non-sewerable due to the terrain contour to be developed and sewaged on a commercially practicable basis.

(II) The collecting tank

Referring now to FIGS. 3 and 4 on sheets 3 and 2 respectively of the drawings, the collecting tank 16 may conveniently be constructed of reinforced concrete or other conventional material suitable for underground use. The tank, as illustrated, comprises upstanding side walls 50, a pair of vertical end walls 52 and 54, and a separable top 56. The configuration of the external surfaces of the side walls is such that the tank may be easily placed in an excavation and remain in place after being covered over with soil.

As shown in FIG. 3, a vertical partition 58 parallel to the end walls 52 and 54 divides the tank 16 into two compartments. The vertical partition 58 is located intermediate the length of the side walls 50 and preferably approximately ¾ the length thereof from the rear end wall 54. The larger and rearmost compartment 60 is defined by the internal surfaces of the rear end wall 54, the side walls 50, and the partition 58, and serves as a sanitary sewage collection region. The length of the collection compartment 60, and thus the proportion of the collecting tank 16 occupied thereby, may be varied as desired together with the height of the walls 50–54 with a view towards accommodating a predetermined volume of sewage. This volume is preferably made sufficiently large so as to hold, without overflow, the amount of sewage likely to collect therein during a period of a few days as may be required for maintenance and/or repair or in the event of a disruption such as an electrical power failure.

Another reason for the large volume of the collection region 60 relative to the expected rate at which sewage will be conveyed is the fluid tight requirements of the compartment 60 and the limited compressibility of the fluid air therein.

Since the compartment 60 is fluid tight, the pressure therein will increase with the addition of sewage. This increased pressure is useful in propelling the sewage from the compartment 60 but must be contained to prevent the venting of noxious odors to the atmosphere.

The sewage collection compartment 60, as defined by the internal surfaces 62 of the side walls 50, is advantageously V-shaped in cross section over its lower extremity. The ever increasing reduction in cross section which results from wall surfaces 62 having an included angle of less than 90°, and preferably about 60°, is significant in that the internal surfaces 62 of the side walls 50 become self-cleaning due to the scouring action of the sewage as the tank is emptied. The adherence of sewage to the internal surfaces 62 is thus minimized and the quantity of sewage which reaches septic conditions in the collecting tank is thus reduced.

While the tank illustrated in the FIGS. 3 and 4 is preferred, other operable configurations may be desirable under particular circumstances. Examples are a vertically disposed cylindrical tank with a conical lower portion, and the combination of a vertical portion having a rectangular cross section with an inverted pyramid shaped lower portion. The walls need not, of course, be planar and the angle of inclination therebetween may advantageously be made to decrease toward the sewage outlet, since the scouring action of the sewage on the walls is a function of the velocity at which the sewage exits the collection compartment. The velocity at which the sewage exits the collection compartment 60 is a function of the cross sectional area of the orifice through which the sewage is propelled.

With continued reference to FIGS. 3 and 4, an inlet conduit 64 may be disposed in the rear end wall 54, preferably at the bottom of the tank. The conduit 64 may be disposed so that the internal surface 66 thereof at its lowest point is substantially flush with the extreme bottom 68 of the collection region 60, i.e., the apex of the V formed by the side walls surfaces 62. A layer of concrete grout may be used to form a through flow channel along the bottom surface 68 thereby providing a high velocity of sewage flow which also assists in removing solids as the tank is emptied.

The entry of fresh sewage at the bottom of the tank also tends to eliminate splashing which might cause false actuation of the level control switches described infra and tends to reduce the agitation of the contents of the tank and the sticking of sewage on the internal surfaces 62 of the side walls 50 thereby reducing the generation of the undesirable odors normally associated with the agitation of sewage. It may be desirable, however, to introduce fresh sewage into the collection compartment at a point nearer the top of the tank in some applications. Such an application might be, e.g., where the venting of the collection compartment is through the inlet conduit to a standpipe at a remote location.

Locating the sewage inlet conduit 64 in the bottom portion of the collection compartment 60 has the additional advantage of reducing the depth at which the collecting tank 16 must be buried to accommodate the below frost line depth desired for the inlet conduit 64. There may also be legal requirements as to the depth at which the inlet conduit 64 must be buried.

As illustrated in FIG. 3, an outlet sewage collector pipe 70 may be similarly located at the vertical partition 58 adjacent the apex of the V formed by the internal surfaces 62 of the side walls 50. The outlet conduit 70 extends forwardly through the partition 58, through the compartment 72 housing the control and vacuum valve apparatus, and through the forward end wall 52 of the collecting tank 16. Preferably the opening of the conduit 70 is slightly smaller than the inner diameter of the lines 22 so that entrance of oversized solids therein may be prevented. Blockages in the valve 76 and in the lines 22 are thus reduced, and will occur instead in the collection compartment 60 where they are more easily corrected. The blockage location problem is, of course, also obviated in this manner.

It is desirable that the sewage outlet conduit 70 be located at the extreme bottom of the compartment 60. This may be effected in the embodiment illustrated either by making the compartment 60 deeper at that end or by simply burying the entire collecting tank 16 at a slight downward angle in the direction of flow.

The control and valve apparatus compartment 72 is defined by the internal surfaces 62 of the two side walls 50, the forward surface 80 of the vertical partition 58, and the internal surface 81 of the forward end wall 52. As indicated in FIG. 3, the control compartment 72 may have the same general cross sectional configuration as the sewage collection region 60 as a matter of convenience. A vacuum valve 76 is located intermediate the length of the outlet pipe 70. The valve 76, normally closed except during the period when the collecting tank 16 is being emptied, may be operated by an electrical motor 74 in response to control signals derived from a control box 78 mounted at the upper part of the control compartment 72 adjacent the vertical partition 58.

The valve control box 78 may conveniently be located some distance from the valve 76, e.g., in a basement installation. The valve 76 may also be physically located apart from the collecting tank if so desired. The valve 76 may, of course, be hydraulically or pneumatially operated rather than by the electric motor 74 as described, the electric motor 74 being replaced by a suitable hydraulic or pneumatic valve actuating device, without departing from the method of operation envisioned for the system.

The top 56 to the collecting tank 16 may be provided with two cylindrical pipes 84 and 86 serving as manholes and having separate covers 88 and 90. The cover 88 may be sealed in an airtight relation to the manhole pipe 84 to prevent the escape of odors and to permit the building up of pressure in the compartment 60 as sewage is accumulated therein. The manhole cover 88 is provided with a one-way valve 92 that permits the entry of air at atmospheric pressure into the sewage collection compartment 60 but denies the egress of undesirable odors therefrom. Thus, when the vacuum valve 76 is open and the collection region 60 emptied, air can enter the collection compartment 60 to prevent the development of a vacuum therein. The entry of a volume of air into the line 22 behind each discharge volume of sewage is, of course, important in providing the pressure differential necessary for effective conveyance of the sewage through the vacuum lines in a condition of vacuum induced plug flow.

The cover 90 for the pipe 86 may be any suitable manhole cover, preferably weather-tight and removable so that the equipment in the compartment 72 may be readily serviced.

The control box 78 may receive operating power from a conventional source (not shown) such as a 110 volt A.C. commercial utility power line. Operating power is, in the embodiment illustrated in FIG. 3, supplied to the motor 74 through a multi-conductor cable in a conduit 93. Extending from the control box 78 through a conduit 94, and through the partition 58 into the sewage collection region 60, are fluid lines (not shown). These fluid lines are connected to an upper liquid level sensing unit 96 and to a lower liquid level sensing unit 98. These units 96 and 98 may be conventional in construction and may serve as actuating elements for alarm and valve 76 actuating relays in the control box 78. The fluid lines may be of the pneumatic or hydraulic type and may, of course, be replaced by a conventional electrical system if so desired.

A two wire cable 100 is illustrated as exiting from the conduit 93, adjacent the motor 74. The cable 100 may then pass through an aperture in the front wall 52 of the tank 16 and may conveniently be positioned alongside the vacuum line 22. The cable 100 may thus be laid in a trench concurrently with the vacuum line 22 and may extend to a remote monitor and control station, as will be described. The remote monitor station may be at any convenient location, such as ejector or transfer station 26, or the sewage treatment plant 29 of FIGS. 1 and 2.

As explained in connection with FIG. 1, one of the advantages of the present invention is its unique adaptation for use in a vacation area such as a beach or mountainous area where the houses to be served are used only on an intermittent basis, i.e., on week-ends and during holiday seasons. The collecting tank 16 as disclosed in connection with FIG. 3 may thus be comparatively large in relation to the quantity of sewage generated in such a house and it may be desirable, under periods of infrequent use, to empty the collecting tanks on a periodic basis such as once each week.

As the area develops and more houses are present, or as the use of the sources increases, the instant invention contemplates the emptying of the collecting tanks on the basis of the quantity of sewage which has accumulated in the collecting tank 16. Accordingly, the sensing element 98 may be provided to detect the fluid level. With a tank having dimensions such that the sewage collection compartment 60 is ten feet long, about five feet wide at the top, and about five feet deep, a hundred gallons of sewage will provide a depth of about one foot. Two-hundred and fifty gallons will provide a depth of about one and one-half feet. Four hundred gallons will provide a depth of about two feet; nine hundred gallons will provide a depth of about three feet; and the entire tank will hold nearly fourteen hundred gallons.

When the system is operating automatically, it is desirable to empty the collecting tank 16 when the accumulation constitutes not more than about two hundred gallons and preferably not more than about 100 gallons. Thus, the level detector switch 98 may be located only about one foot from the bottom of the collection compartment 60. When the accumulation of sewage reaches a predetermined volume the control circuit in the control box 78 is switched to the "valve open" position. Valve 76 is then opened by the motor 74 and the sewage in the collection compartment 60 is propelled through the outlet pipe 70 in plug form into the vacuum line 22 by the resulting pressure differential.

The sensing unit 98 is conveniently of the fluid pressure type but is actuated and deactuated at different levels as is common in electrical relays due to the hysteresis characteristics thereof. As the sewage level in the collection compartment 60 falls through the lower or deactuation level, i.e., a level of about the top of the outlet pipe 70, the sensing unit 98 effects the switching of valve 76 to the "valve closed" position. Because of the finite period necessary to completely close the valve 76, a predetermined volume of air is introduced through the valve 76 into the outlet conduit 70. As previously discussed, the air thus introduced advances the plug of sewage through the conduit 22 toward the station 26.

The upper liquid level detector 96 may be provided in the collecting tank 16 at a greater depth, perhaps two or three feet. The detector 96 may be utilized to actuate visual and/or sonic alarms at the collecting tank 16, at a remote location where operation of the system is monitored, or both. The location of the detector 96 in the collection compartment 60 may be adjusted so that there is substantial storage capacity within the compartment even after the alarm is energized. Sewage may therefore be allowed to accumulate safely for another day or two without overflow. Sufficient time for the correction of any malfunctions and/or interim relief in the form of emptying the accumulated sewage into a truck carrier, or otherwise portable, tank may thus be provided.

As also illustrated in FIG. 3, a conventional pressure sensing device VS, for example, of the bellows or diaphragm type, is placed in the line 22, near or adjacent to the vacuum valve 76. As hereinafter explained the pressure sensing device prevents the valve from opening if the pressure in the line 22 exceeds a predetermined limit, preferably about ½ that of the atmosphere. In this manner, efficient emptying of the collection compartment is assured.

Turning now to the circuit diagram of FIG. 5 on sheet 4 of the drawings, the motor 74 of FIG. 3 may be reversible and thus provided with two windings labeled "Open" and "Close" which relate to the direction of rotation necessary to open or close the vacuum valve 76. The circuit illustrated in FIG. 5 is capable of effecting automatic operation based on the volume of sewage accumulated in the collection compartment 60. When so desired, the automatic operation may be overriden so that the valve 76 can be operated manually from a remote control panel, such as that illustrated in FIG. 12.

The motor 74 contains a shaft which rotates in opposite directions to open and close the valve 76. The shaft between the motor and the valve contains a pair of cams 102 and 104 which are illustrated in the "valve closed" position in FIG. 5. When the motor 74 is energized to open the valve 76, the cams 102 and 104 rotate in a counter clockwise direction through an angle of approximately 91°. At the end of the motor travel, the follower 106 drops, thereby transferring movable switch member 108 from the contact 110 to the contact 112. This causes the motor to become deenergized and the valve to remain in an open position.

When the motor 74 initiates the opening of the valve 76, the cam 104 also rotates in a counter clockwise direction and immediately transfers the switch blades 114 and 116 to their alternate position in contact respectively with the contacts 140 and 138 where they remain until the motor 74 has been energized by the circuit hereinafter described to close the valve 76 and the valve 76 has in fact returned to its fully closed position. The operating power causing the valve 76 to close is disconnected from the motor when the cam 104 has returned to its illustrated position.

When the low level switch 98 located about the top of the vacuum line conduit 70 in FIG. 3 is closed, the sewage in the collection compartment 60 and a volume of air will be admitted through the valve 76 and into the vacuum lines 70 and 22 during the time interval required for the motor 74 to close the vacuum valve 76. Adjustment of the elevation of the switch 98 downwardly will, of course, with a constant time delay, increase the admission of air into the line, and the adjustment of the elevation thereof upwardly will decrease the admission of air into the conduits 70 and 22 following each emptying of the collection compartment 60.

With continued reference to FIG. 5, the components that are for convenience installed in the control box 78 are shown in the center portion of the figure. The electrical cables 118, 120 and 122 which supply operating power to the motor 74, are contained in the conduit 93 of FIG. 3. Also in the conduit 93 are the leads 124 and 126 which are connected together when switch contact 114 transfers to the contact 140. This condition exists at all times that the valve 76 is not seated in its "valve closed" position.

Operating power may be supplied from commercial power lines through the circuit breaker contacts 128 to the leads 130 and 132. The lead 132 is connected directly to the conductor 118, which is in turn connected to a common terminal of the windings of the motor 74. Power on the lead 130 is connected to the "open" winding or to the "closed" winding of the motor 74 through various switch contacts which are opened or closed in accordance with the energization condition of their associated relay coils. The switch contacts are illustrated in FIG. 5 with conventional notations, i.e., a diagonal line shown through the contacts indicates that the contacts are normally closed, that is, closed when the associated coil is deenergized. The absence of a diagonal line indicates that the switch contacts are normally open, i.e., open when the associated coil is deenergized.

The direction of rotation of the motor 74 is controlled by the energization condition of the relay coil RD. When the relay coil RD is energized by the application of power from the lead 130 to the junction 134, the normally open contacts RD-1 are closed and power is supplied through lead 120 to the switch contact 116. If the valve 76 is not closed, the motor 74 is energized continuously until such time as valve 76 does close.

In order to effect the opening of the valve 76, it is necessary that power be supplied through the lead 122 at a time when the valve 76 is at a position other than completely open. The lead 122 cannot be connected to the power on lead 130 when the coil RD is energized because of the normally closed switch contacts RD-2. It is thus necessary to deenergize the relay coil RD to open the vacuum valve 76.

The relay coils RB and RC cannot be energized unless the remote control unit 136 is connected and set for manual operation. In the following discussion, it will be assumed that either the remote control unit is not connected, or that it is connected but set for automatic operation. In the "automatic" mode, the relay contacts RB-2 and RC-2 are closed and the relay contacts RB-1, RB-3 and RC-1 are open as illustrated in FIG. 5.

The liquid level switch 98 serves as the normal means for detecting the sewage level at the point when vacuum valve 76 should be opened and closed and respectively actuates the normally closed switch contacts PS-1 and the normally open switch contacts PS-2. So long as the sewage level is below that where it is desired to empty the tank, the contacts PS-1 will remain closed and the contacts PS-2 wil remain open. Hence, power from the lead 130 is supplied to the terminal 134 and the relay coil RD through the normally closed contacts RB-2 and PS-1.

The normally closed contacts TD-1 are opened when the relay coil TD is energized. The relay coil TD is energized when the vacuum switch VS-1 is closed. The vacuum switch VS-1 is a part of the pressure sensing device VS shown in FIG. 3, which as previously mentioned, is utilized to sense the vacuum present in the conduit 22. Specifically, if the vacuum in the conduit 22 is inadequate to effect an efficient emptying of the compartment 60, i.e., the pressure is above the predetermined limit, the switch contacts VS-1 will be opened to deenergize the relay coil TD and thus cause the switch contacts TD-1 to remain closed. Power from lead 130 will be provided to the terminal 134 of the relay coil RD through normally closed contacts RB-2 as long as the contacts TD-1 are closed.

Assuming adequate vacuum in the line 22 so that the relay coil TD is energized and the switch contacts TD-1 are opened, the motor 74 will be energized to open the vacuum valve 76 as soon as the switch contacts PS-1 open and the switch contacts PS-2 close. At this moment, the circuit from the lead 130 to the lead 132 is through the switch contacts RD-2, PS-2 and RD-2, lead 122, switch contacts 108 and 110, the "open" winding of the motor 74, and the lead 118. As the motor 74 opens the vacuum valve 76, the cam 102 rotates counter clockwise until the cam follower 106 drops to move the switch contact 108 into engagement with the contact 112.

The circuit remains in this condition until the liquid level has dropped below the point where the switch contacts PS-2 open and the contacts PS-1 close. Since the cam 104 will also have been rotated counter clockwise during the opening of vacuum valve 76, the switch contacts 116 and 138 will be engaged so that operating power can be applied from the lead 130 to the "close" winding of the motor 74 through switch contacts RB-2, PS-1 and RD-1, lead 120 and the switch contacts 116 and 138. Operating power from the lead 130 is normally connected through these switch contacts to the lead 120 and to switch contact 116 at all times when the relay coil RD is energized. Operating power is thus continuously applied to the motor 74 for closing the valve until such time as cam 104 has returned to the position illustrated.

As soon as the vacuum valve 76 is opened and the emptying of the collection compartment 60 of the tank illustrated in FIG. 3 is initiated, the vacuum in the conduit 22 at the sensing device VS may be sufficiently low to cause the switch contacts VS-1 to open at least for a portion of the emptying cycle. If the contacts switch VS-1 should open, the operating power to the relay coil TD will be removed. To prevent the relay contacts TD-1 from immediately closing and thus energizing the relay coil RD to cause the vacuum valve 76 to again close, the coil TD may be of the type which introduces a predetermined time delay before its contacts TD-1 open. For the system herein described, a time delay on the order of from five to ten seconds has been found to be satisfactory.

With continued reference to FIG. 5, the remote control unit for the collecting tank 16 previously described in connection with FIGS. 3 and 4 may be located at a maintenance station. The maintenance station may be located at one of the ejector stations 26, the sewage disposal plant 29, or any other convenient location. The cable 100 may be laid in the trench along with the vacuum conduit 22, as earlier described, and may contain the two conductors 150 and 152, as illustrated in FIG. 3.

A control box 136 may conveniently be provided at the remote maintenance station. The box 136 may conveniently include a series of indicator lamps C-1 through C-5 and an audible alarm B. Operating power may be applied through the leads 154 and 156 of a commercial 110 volt A.C. power supply. One terminal of the alarm B and lamps C-1 through C-5 may be directly connected to a common lead 156.

A step-down transformer 158 may be provided with its primary winding connected between leads 154 and 156 and its secondary winding selected or tapped off in a conventional manner to provide a lower voltage suitable for energizing the indicator lamps and alarm, e.g., 24 volts.

Additional 24 volt transformers IT-1 and IT-2 may be provided across the 110 volt leads 154 and 156. One terminal of each of the secondary windings of the transformers IT-1 and IT-2 may be grounded as illustrated and the other terminal connected respectively to the leads 150 and 152.

The circuit containing the secondary winding to the transformer IT-2 also contains two diodes D-3 and D-4 oppositely poled so that current flow through the secondary winding of the transformer IT-2 is effectively blocked except through one of the circuit elements in parallel with the diodes D-3 and D-4. The ungrounded side of the secondary winding of the transformer IT-2 may be connected through the lead 152 to the control box 78 at the collecting tank 16 for remote operation of the valve 76 as will be explained.

Similarly, the circuit containing the secondary winding of the transformer IT-1 contains two diodes D-1 and D-2 oppositely poled so that current flow through the secondary winding of the transformer IT-1 is effectively blocked except through the circuit elements in parallel with the diodes D-1 and D-2. The ungrounded side of the secondary winding of the transformer IT-1 may be connected through the lead 150 to the control box 78 at the collecting tank 16.

For automatic operation as has been explained in the foregoing, the contacts SA-1, SA-2 and SA-3 of a manually operated switch SA assume the positions indicated in FIG. 5. The contacts SA-1 are closed thus energizing the lamp C-4 to indicate that the system is operating in the "automatic" mode. The contacts SA-2 are open thereby deenergizing the lamp C-5 which indicates, when energized, that the system is operating in the "manual" mode.

The contacts SA-3 are open thus allowing the unidirectional charatceristics of the diode D-1 to control the flow of current through the lines 150 and 124 to switch contacts 140. The circuit can thus be traced from the transformer IT-1, the diode D-1, the line 150, the diode D-5, the line 124, the switch contacts 140 and 114, and the line 126 through ground and the relay coil RE at the control box 136.

The valve 76 controlled position of the switch 114 thus controls the flow of current through the relay coil RE when the system is operating in the "automatic" mode. The energization of the relay coil RE closes the normally open contacts RE-1 to energize the lamp C-2 indicating that the valve 76 is open. Likewise, the normally closed contacts RE-2 will be closed thereby removing power from the lamp C-3 which indicates the fully closed position of the valve 76.

Should the switch contacts 114 and 140 not be in engagement, the relay coil RE will not be energized and the energization of the lamps C-2 and C-3 will be reversed indicating that the valve 76 is open.

All of the switch contacts SA-1, SA-2 and SA-3 must be reversed to place the system in the "manual" mode of operation. The energization of the lamps C-4 and C-5 is reversed by the contacts SA-1 and SA-2. The closing of the contacts SA-3 shorts out the unidirectional impedance of the diode D-1 allowing current to flow from the transformer IT-1 through the diode D-2, ground, the diode D-6, the relay coil RB, the line 150 and the closed switch contacts SA-3.

The shorting of the relay coil RE by the diode D-2 will cause the lamp C-3 to remain energized. The energization of the relay coil RB will close the normally open contacts RB-1 thus enabling the energization of the relay coil RC as will be later explained.

The normally closed contacts RB-2 are opened to remove the control of the relay coils TD and PS upon the energization of the terminal 134 of the relay coil RD. The normally open contacts RB-3 are, however, closed to apply power to the terminal 134. Since the contacts HL-1 of the high sewage level switch 96 are open, as are the contacts of the switch SB, current cannot flow in the line 152.

With the manual closing of the switch SB, current will flow from the transformer IT-2 through the diode D-4, the line 152, the diode D-8, the closed contacts RB-1, the relay coil RC, ground and the contacts of the switch SB. The energization of the relay coil RC will close the normally open contacts RC-1 to apply power from the lines 130 and 122 through the contacts RD-2, 108 and 112 and the "open" winding of the motor 74 to the lines 118 and 132. The simultaneous opening of the normally closed relay contacts RC-2 will deenergize the relay coil RD and the "close" winding of the motor 74.

The switch SB may conveniently be spring biased so that the contacts thereof will not be inadvertently left in a closed position which would destroy the vacuum in the system through the one way valve 92 in the top of the collecting tank 16. The opening of the switch contacts SB will, of course, denergize the relay coil RC and thus return the valve 76 to its normally closed position.

Closure of the contact HL-1 of the high sewage level switch 96 will short out the unidirectional impedance of the diode D-8 thus providing a current path from the transformer IT-2 through the diode D-3, ground, the diode D-7, the switch contacts HL-1, the line 152 and the relay coil RA. Energization of the relay coil RA will close the normally open contacts RA-1 to energize both the "alarm" lamp C-1 and the sonic alarm B. The alarms C-1 and B will remain energized until the contacts HL-1 are opened irrespective of the position of the switch SA, the "manual" or "automatic" mode of system operation, and the opening and closing of the valve 76. A manual switch (not shown) may be conveniently provided to short out the sonic alarm B if so desired.

(III) The transfer station

Figure 6:
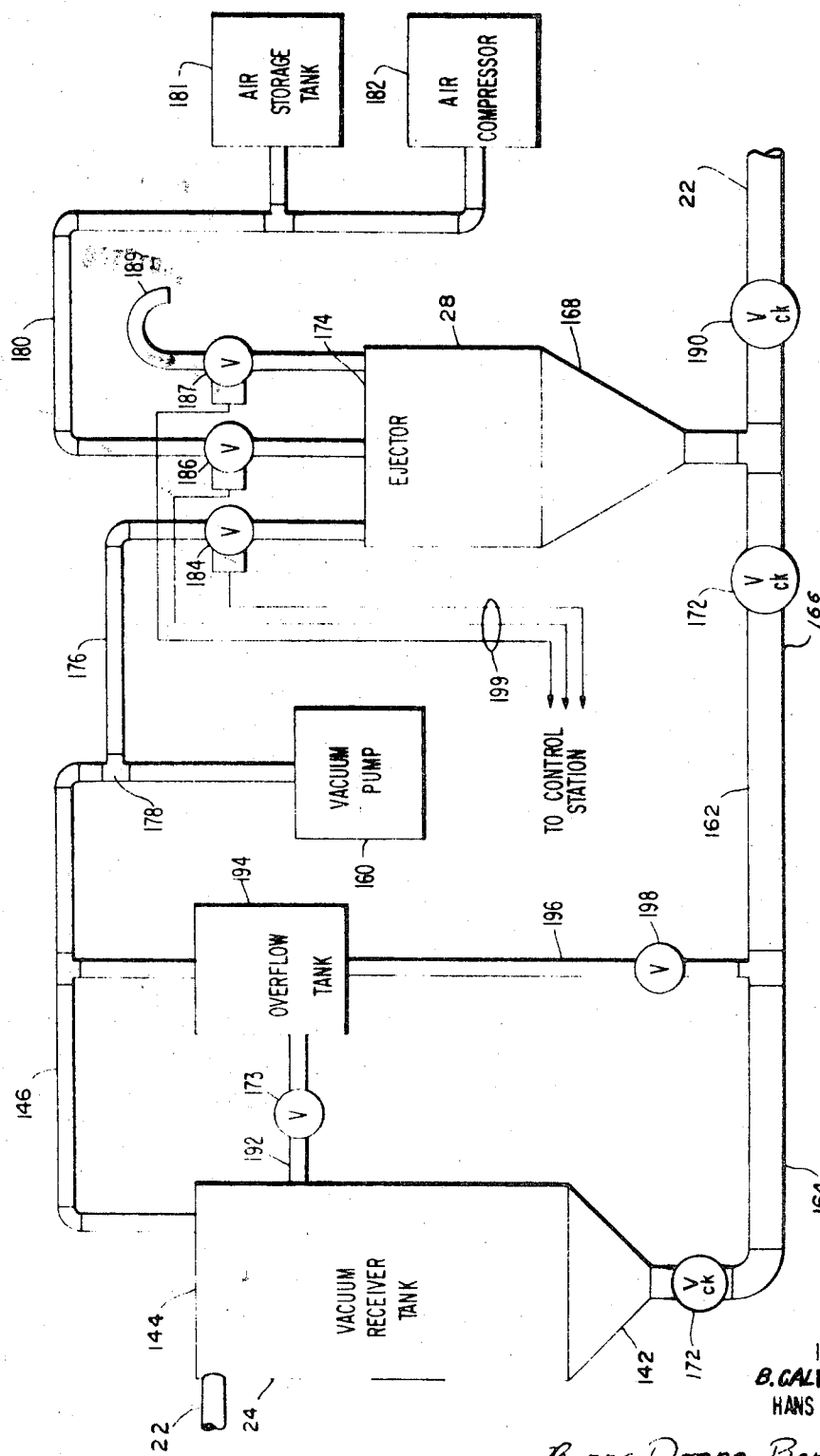
FIG. 6 is a diagrammatic view of an intermediate transfer station.

Referring now to the schematic diagram of the ejector or transfer station 26 illustrated in FIG. 6 of sheet 5 of the drawings, the vacuum receiver tank 24 receives plugs of sewage from the vacuum line 22 of FIGS. 1 and 2. The vacuum receiver tank 24 may be vertically or horizontally disposed depending on the anticipated operating conditions and the settling properties of the solid matter likely to be encountered in the sewage. The tank 24 may conveniently receive the plugs of sewage from the line 22 as is shown in FIG. 6, between the extremities 142 and 144. Connected to the vacuum receiver tank 24 at the upper extremity 144 thereof by means of a vacuum line 146 is a conventional corrosion resistant metal type vacuum pump 160.

A conduit 162 communicates at one end 164 with the lower extremity 142 of the vacuum receiver tank 24 and at the other end 166 with the lower extremity 168 of the ejector 28. The conduit 162 may be provided with a conventional check valve 172 adjacent both the ejector 28 and the vacuum receiver tank 24.

The vacuum pump 160 is also connected to the upper extremity 174 of the ejector 28 by means of a vacuum line 176 which, for reasons to be subsequently explained, also communicates with the vacuum line 146 at a junction 178. Also connected to the upper extremity 174 of the ejector 28 by means of a high pressure line 180 is a conventional accumulator or air storage tank 181 and an air compressor 182. Suitable mechanized or motor operated valves 184 and 186 may be provided respectively adjacent the ejector 28 in the vacuum line 176 and the high pressure line 180.

The valve 184 will, when properly energized, close the vacuum line 176. The valve 187 on a vent 189 is adapted to release the pressure within the ejector 28 to atmosphere after the valve 184 is closed but prior to the opening of the valve 186 in the high pressure line 180 as will be later explained. The valve 187 is also used to vent the pressure in the ejector 28 to the atmosphere after the emptying thereof and prior to the reopening of the valve 184 in the vacuum line 176. Any suitable and well known interlock mechanism may be utilized to insure the proper sequence of operation of the valves 184, 186 and 187.

While not specifically illustrated in the schematic drawing of FIG. 6, the valves 184, 186 and 187 may be equipped with conventional limit switches operable to indicate the fully open or fully closed condition of the valves. These limit switches may be connected by means of suitable electrical cables 199 to a control panel 250 at the remote monitor and control station hereinafter described in connection with FIG. 12.

The downstream extension of the vacuum line 22 is connected to the lower extremity 168 of the ejector 28 and may be provided with a conventional one way or check valve 190 adjacent the ejector 28.

Also connected to the vacuum receiver tank 24 may be a combination vacuum and sewage overflow tank 194 in fluid communication by way of a conduit 192. The vertical height of the conduit 192 may conveniently be slightly less than the height of the vacuum receiving tank 24 so as to prevent the collection of sewage in the overflow tank 194 until the tank 24 is substantially filled even with the valve 173 open.

An overflow conduit 196 is utilized to connect the overflow tank 194 with the conduit 162. Any suitable and conventional, manual or remotely controlled, valve 198 may be connected into the overflow conduit 196 to control the flow of sewage therein.

In operation, sewage is received from vacuum line or conduit 22 under the influence of the subatmospheric pressure existing in the vacuum receiver tank 24. The sewage collects in the tank 24 until gravity flow can be established through the conduit 162 and the open check valves 172 to the ejector 28. Since the pressure in the ejector 28 must be at least as low as that in the vacuum receiver tank 24 to establish the flow of sewage through the conduit 162, the valve 184 in the vacuum line 176 must be open at this time and the valves 186 and 187 in the high pressure line 180 and the vent 189 must be closed. In the absence of an adverse pressure differential between the tank 24 and the ejector 28 the sewage level in the ejector 28 will remain substantially the same as the level in the vacuum receiver tank as the level of sewage rises in the vacuum receiver tank 24.

When the level of sewage in the ejector 28 rises to an appropriate level, the valve 184 in the vacuum line 176 is closed and the ejector 28 released to atmospheric pressure through the valve 187. After closure of the valve 187, the valve 186 in the high pressure line 180 is opened in response to an appropriate signal on the cable 199. The pressure differential which results from the subatmospheric pressure in the line 22 and the adjacent downstream vacuum receiver tank 24, together with the application of air at a superatmospheric pressure from the compressor 182, closes the check valve 172 in the conduit 162 and forces open the check valve 190 in the line 22. The sewage from the ejector 28 is thus discharged through the line 22 towards the vacuum receiver tank 24 of the next subsequent transfer station 26 in plug form at a high speed. The valves 172, 184, 186 and 190 must, of course, remain in this condition for a time interval sufficient to empty the ejector 28 and to admit a quantity of air from the compressor 182 into the line 22 behind the sewage plug. The valve 198 in the overflow conduit 196 will remain closed during the normal cycling described. If desired, the sewage may be discharged from the ejector into any conventional line such as a gravity flow line or force main instead of into another vacuum line 22.

After ejection of the sewage from the ejector 28, the valve 190 in the line 22 and the valve 186 in the high pressure line 180 are closed. After venting the pressure in the ejector 28 to the atmosphere through the valve 187 and reclosing the valve 187, the valve 184 in the vacuum line 176 is opened to equalize the pressure in the vacuum receiving tank 24 and in the ejector 28. Sewage will again be drained under the influence of gravity from the vacuum receiver tank 24 to the ejector 28 as earlier described.

A second ejector may conveniently be provided at the transfer station 26. In this instance, one ejector may be accumulating sewage from the vacuum receiver tank 24 while the second ejector is discharging previously collected sewage under the influence of the superatmospheric pressure of the air from the compressor 182 and the subatmospheric pressure in line 22. Upon the completion of the discharge of the sewage in the second ejector and the accumulation of a volume of sewage in the first ejector, the vacuum and high pressure connections to the ejectors may be reversed together with the condition of the appropriate conduit valves to repeat the cycle.

In the event of an accumulation of sewage in the overflow tank 194, the valve 173 in the conduit 192 may be closed and the ejector 28 filled from the overflow tank 194 through the opened valve 198 in the overflow conduit 196. The valve 172 in the end 164 of the conduit 162 will, of course, be closed at this time by the pressure of the sewage in the line 162.

Suitable conventional status and alarm devices, e.g., high sewage level may be installed in the tank 24 and in the ejector 28 to indicate malfunctions. Typically an alarm in the overflow tank 194 may signal the first instance of overflow.

(IV) The plug reformer

Referring now to FIGS. 7 and 8 on Sheet 3 of the drawings wherein a first embodiment of the novel plug reformer of the present invention is illustrated, a section 200 of conduit is provided with conventional means 202 for coupling the extremities 204 and 206 thereof into the vacuum line 22. Intermediate the extremities 204 and 206, the section 200 is formed into one or more generally helical turns 208 about the longitudinal axis of the vacuum line. One or more low spots 210 or pockets are thus provided in which the sewage may collect under the force of gravity to form a coherent plug entirely filling the cross-sectional area of the line.

The helical configuration of the plug reformer, in addition to providing the low spots 210 for the collection of sewage, imparts a rotation to the plug of sewage as it is forced therethrough. Since breakdown of the plug occurs primarily due to the influence of gravity, the rotation of the sewage upward from the bottom of the sewage line will reduce the tendency of the plug to elongate and to thus break down. In addition, the rotation tends to assist the highly desirable normal comminution (hydraulic disintegration) of the solids thereby increasing the direct exposure of the sewage to oxygen in the air which provides the propulsion force for the sewage plug. The upstream addition of sewage treating substances may materially improve the subsequent treatment of the sewage for any substance thus added will be thoroughly mixed with the sewage in the comminution thereof in the plug reformers.

Referring now to FIGS. 9 and 10 on Sheet 3 of the drawings for a second embodiment of the plug reformer of the present invention, a short section 212 of conduit is provided at both ends 214 and 216 with conventional means 218 for coupling the same into the vacuum line. Intermediate the ends 214 and 216, the section 212 of conduit is rotated one full turn in helical fashion to provide a single depression or low spot 220 wherein sewage may collect until the cross-sectional area of the line is entirely filled. The second embodiment is distinguished from the first embodiment in that the turn is completely below the level of the vacuum line. The diameter of the loop and/or the diameter of the line may be increased as a means of increasing the storage volume of the plug reformer. The increased size of the plugs may also be achived by the utilization of a plurality of loops.

The helical rotation of the plug reformer of the second embodiment also imparts a rotation to the sewage which forms the plug. This rotation reduces the tendency of the plug to break down as the plugs traverses the line under the influence of the pressure differential existing thereacross as described in connection with FIGS. 7 and 8.

The helical plug reformers of the embodiment illustrated in FIGS. 7 and 8 have an additional advantage in that they may be laid in the trench dug for the installation of the vacuum line without the necessity for materially increasing the depth of the trench. A significant saving in both time and labor may thus be achieved.

(V) Y connections

Figure 11:
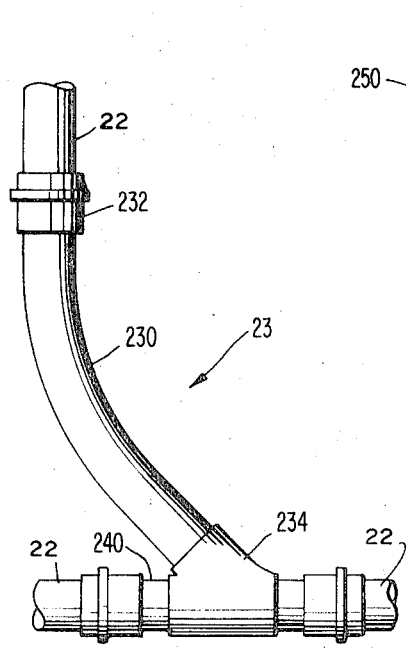
FIG. 11 is a top plan view of a vacuum conduit Y connection utilized at the junction of the collecting tank output conduit with the vacuum conduit into the transfer station.

Referring now to FIG. 11 on Sheet 6 of the drawings, a typical Y connection 23 is shown. As illustrated in FIG. 2, this type of connection may conveniently be utilized at any junction of the vacuum conduit. For example, it has been found expedient to inject the plug of sewage from the feed line from the collecting tanks 16 into the vacuum line 22 between transfer stations 26 at an angle thereto to facilitate the maintenance of the coherency of the plug of sewage. The conduit which forms the Y connection may be entirely conventional in its construction as may be the method of joining the various conduit elements together.

As shown in FIG. 11, a gently curving section 230 of conduit may be connected to the line 22 from the collecting tank 16 by means of a conventional joint 232. The curved section 230 may, as may the short sections of straight conduit 240, also be conventionally connected to the arms of a Y joint 234.

A suitable and conventional check valve may be installed in the joint 232 where, for example, the conduit 22 from the collecting tank 16 runs uphill into the line 22. The use of a check valve will prevent sewage from the line 22 from settling back into the conduit leading from the collecting tank 16.

(VI) The control panel

Figure 12:
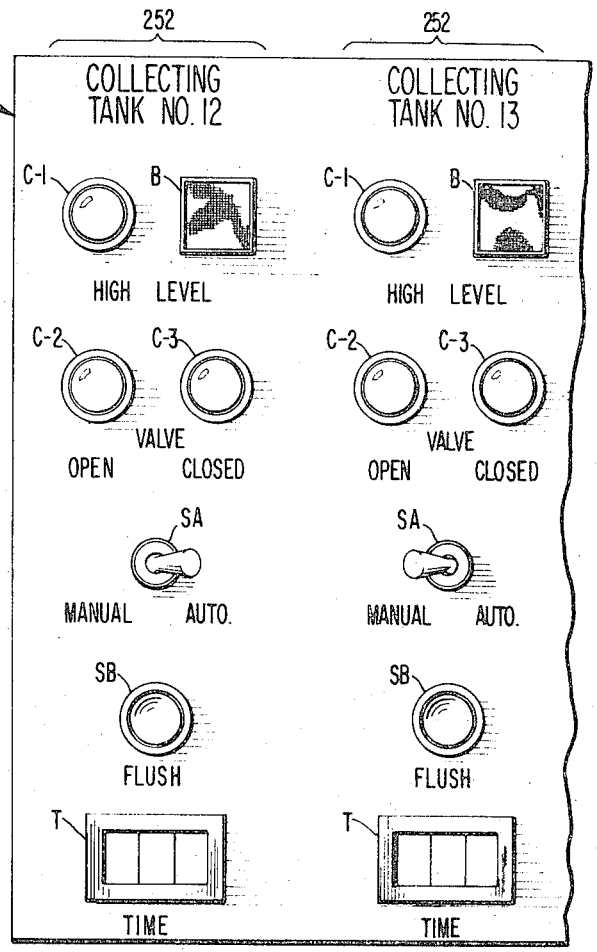
FIG. 12 is a partial view of the control panel at the central control station which contains means for monitoring the status of the operation of the sewer system and control means capable of initiating changes in the system to correct a malfunction therein.

Referring now to FIG. 12 on Sheet 6 of the drawings, a suitable indicator panel 250 may be provided at a remote monitoring and control station with status sections relating to each of the collecting tanks 16 illustrated in FIGS. 1 and 2. Each of the collecting tanks status sections 252 may be provided with the incandescent lamp C-1 and the sonic alarm B in the circuit of FIG. 5 indicative of a high sewage level and activated by the level detector 96 in the collection tank 16 of FIG. 3.

The incandescent lamps C-2 and C-3 of the circuit of FIG. 5 may also be provided for indicating the open and closed position of the valve 76 in each of the collecting tanks 16. The toggle switch SA may also be provided to enable the selection of either "manual" or "automatic" control of the valve 76.

The spring biased switch SB may be installed on the control pane 250 to enable the flushing of the collecting tank 16 once the toggle switch SA has been placed in the "manual" position.

Also provided for each of the collecting tanks 16 may be a conventional intervalometer T. The intervalometer T may comprise a conventional resettable clock or resettable digital counter supplied with suitable pulses taken, for example, directly from the 60 cycle A.C. power supply which supplies energy to the panel 250. While the specific circuitry is not shown, the intervalometers T may conveniently be reset upon the opening of the valve 76 in the conduit 70 of FIG. 3 by a conventional circuit means well known in the art.

A status section (not shown) for each of the transfer stations 26 of FIGS. 1 and 2 may also be provided on the indicator panel 250. These sections may be somewhat complex due to the increased number of valves which may be monitored and manually controlled. For example, suitable incandescent lamps responsive respectively to the open and closed position of the valve 198 in the overflow conduit 196, the valve 190 in the line 22 the valves 172 in the conduit 162 and the valve 173 in the conduit 192 may be provided as may lamps for the three ejector valves 184, 186 and 187 located respectively in the vacuum line 176, the high pressure line 180 and the vent 189 of FIG. 6.

Sewage level detectors (not shown in FIG. 6) may also be provided in the vacuum receiver tank 24, the overflow tank 194, and the ejector 28. These detectors may likewise be connected to suitable indicator lamps to provide a visual indication of the sewage levels in the respective tanks at the indicator panel 250 of FIG. 12.

By means of the panel 250, a single operator may thus have a visual indication of the level of sewage in each collecting tank 16 continuously available as well as an indication of the status of the valve 76 in the output conduit 70 and the length of time since the collection tank 16 was last flushed.

Should the interval become excessive, as indicated by the intervalometer T, and/or the lamp C-1 indicate an undesirable level of sewage in the collecting tank 16, the operator has but to flip the toggle of the toggle switch SA to the "manual" position and depress the button switch SB to cause the motor 74 operated valve 76 to open. The operator may delay the release of the push button switch SB for a short time to allow the admission of air into the conduit behind the sewage plug. The retention of a small volume of sewage for a period sufficient for septic action to commence may thus be prevented by the remote operation of the valve 76.

Likewise, the status of each of the valves at ejection or transfer station 26 serves not only to indicate a malfunction in the system but would pinpoint the problem area and thus facilitate the immediate correction thereof. Moreover, each of the valves 184, 186, 187 and 198 may be remotely operated from the indicator panel 250 by the addition of appropriate override circuits well known in the art.

Similar manual and automatic controls and suitable indication may be provided for each of the air bleed valves 40 and 45 earlier discussed in connection with FIGS. 13 and 14.

(VII) An alternative vacuum system

Figure 15:
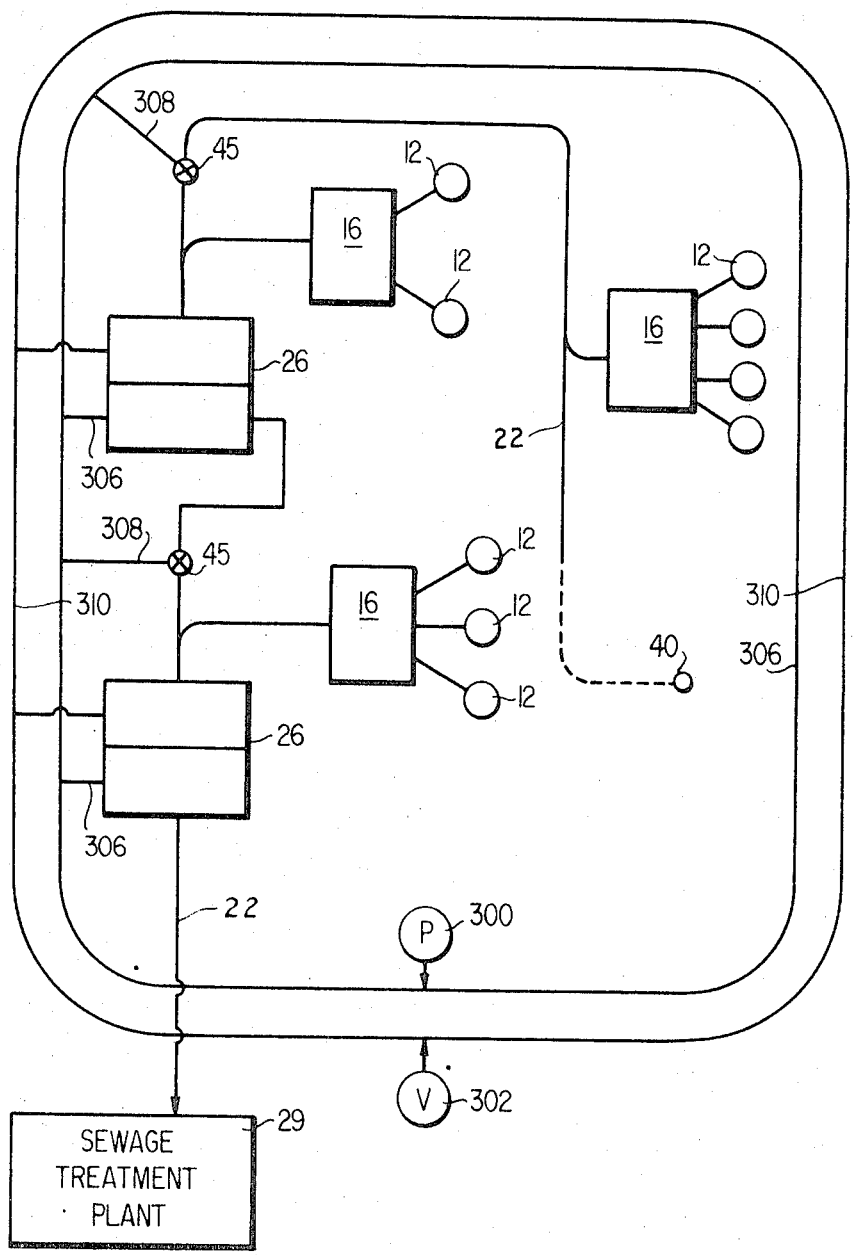
FIG. 15 is a schematic representation of an alternative vacuum system to the system illustrated in FIGS. 1 and 2.

An alternative embodiment of the system as heretofore described is illustrated in FIG. 15 on sheet 7 of the drawings wherein like elements have been accorded like numerals to facilitate an understanding thereof.

With reference now to FIG. 15, a vacuum line 22 extends between an air bleed valve 40 and the sewage treatment plant 29. Intermediate the ends of the vacuum line 22 are a plurality of collecting tanks 16 each connected to receive sewage from a number of sources 12 as earlier described. While only two transfer or ejector stations 26 are illustrated, any number may be utilized as appropriate for the system and topography.

One of the primary distinctions between the system illustrated in FIG. 15 and that earlier described is the omission of separate air compressors and vacuum pumps at each of the ejector stations 26 and the inclusion of a single source of positive pressure 300 and a single source of vacuum 302 at a control station which may be centrally located in the region to be served by the sewer system. The source of positive pressure 300 may be connected by means of a high pressure line 306 to the ejectors at each of the transfer stations 26. Similarly, the source of vacuum 302 may be connected by a vacuum line 310 to each of the vacuum receiver tanks at the transfer or ejector stations 26. In this manner a single source of vacuum may be utilized reducing the need of a vacuum pump at each of the transfer stations 26.

The source of positive pressure 300 may also be connected by means of feeder lines 308 to the vacuum line 22 at the air bleed valves 45.

A suitable conventional check valve may be installed in the vacuum line 22 just upstream of the air bleed valve 45 so that the air introduced into the vacuum line 22 can flow only downstream towards the sewage treatment plant. It is anticipated, of course, that the valve 45 will be remotely operated from the control station, either automatically or upon command.

In actual practice, the high pressure piping 306, the vacuum piping 310, and the sewage piping may all be located in the same trench. Hence, the feeder lines 308 may be very short connections of pipe, and valve 45 may be electrically operate so that impulses of air under pressure can be injected when desired.

The invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

What is claimed and desired to be secured by Letters Patent is:

1. A method for conveying sewage comprising:
   providing a source of sewage;
   passing the sewage from the sewage source by gravity flow through a collecting line conduit into a sewage collecting tank having a volume large relative to the rate of production of sewage to thereby accumulate the sewage in the collecting tank over a period of time;
   providing a vacuum receiver tank at a location remote from the collecting tank, the vacuum receiver tank communicating with the sewage collecting tank by a vacuum line conduit;
   intermittently emptying the collecting tank into the vacuum line conduit by opening a vacuum valve; and
   maintaining the vacuum valve in the open position for a period of time sufficient to substantially empty the sewage collecting tank and to admit a volume of air through the valve into the vacuum line conduit behind the sewage to propel the sewage from the collecting tank through the vacuum line conduit toward the vacuum receiver tank by vacuum induced plug flow.

2. The method of claim 1 including the further steps of accumulating the sewage in the vacuum receiver tank, transferring the sewage from the vacuum receiver tank to a positive pressure ejector, and ejecting the sewage from the positive pressure ejector into a further conduit.

3. The method of claim 2 wherein the sewage is transferred from the vacuum receiver tank to the positive pressure ejector by gravity flow and wherein the further conduit is a vacuum line conduit, the positive pressure ejector being normally in closed fluid communication with a second vacuum valve in the further conduit.

4. The method of claim 3 including the steps of opening the second vacuum valve in response to the collection of a predetermined volume of sewage in the positive pressure ejector, and maintaining the second vacuum valve in the open position for a period of time sufficient to substantially empty the positive pressure ejector of sewage and to admit a volume of air into the further vacuum conduit behind the sewage to propel the sewage from the positive pressure ejector through the further vacuum line conduit by vacuum induced plug flow.

5. The method of claim 1 including the step of sensing the volume of sewage in the collecting tank and wherein the step of opening the vacuum valve is performed in response to the collection of a predetermined volume of sewage in the collecting tank.

6. The method of claim 1 wherein the vacuum valve is periodically opened.

7. The method of claim 1 including the further steps of admitting air at atmospheric pressure to the collecting tank when emptying the collecting tank and preventing the escape of air therefrom as the collection of sewage in the collecting tank compresses the air in the collecting tank to increase the pressure differential propelling the plug of sewage when the vacuum valve is opened.

8. The method of claim 1 including the steps of providing at least one plug reformer in the vacuum line conduit between the collecting tank and the vacuum receiver tank, and introducing air, at a pressure at least as great as the atmospheric pressure, into the vacuum line conduit on the side of the plug reformer away from the vacuum receiver tank.

9. The method of claim 8 including the step of introducing a sewage pretreatment substance into the vacuum line conduit on the side of the plug reformer away from the vacuum receiver tank.

10. The method of claim 4 including the steps of:
    sensing the volume of sewage in the collecting tank;
    providing at least one plug reformer in the vacuum line conduit between the collecting tank and the vacuum receiver tank;
    introducing air, at a pressure at least as great as the atmospheric pressure, into the vacuum line conduit on the side of the plug reformer away from the vacuum receiver tank; and
    wherein the step of opening the vacuum valve is performed in response to the collection of a predetermined volume of sewage in the collecting tank.

11. The method of claim 1 including the further steps of reforming the sewage in the vacuum line conduit into plugs and rotating the reformed sewage plugs to reduce the tendency of solids to settle in the vacuum line conduit.

12. The method of conveying sewage to a sewage treatment plant comprising the steps of:
providing a vacuum line condiut for conveying sewage by vacuum induced plug flow toward a sewage treatment plant;
providing a plurality of plug reformers at spaced intervals along the length of the vacuum line conduit;
creating a subatmospheric pressure in the sewage treatment plant end of the vacuum line conduit; and
introducing air, at a pressure at least as great as the atmospheric pressure, into the vacuum line conduit at spaced intervals along the length thereof.

13. The method of claim 12 including the step of imparting rotation to the sewage plugs as they are propelled from the plug reformers.

14. The method of claim 12 wherein the air is introduced continuously into the vacuum line conduit.

15. The method of claim 12 wherein the air is introduced periodically into the vacuum line conduit.

16. A sewage conveying system comprising:
a plurality of collecting tanks;
means for introducing air into said tanks;
a plurality of plumbing fixtures;
conduit means for conveying sewage by gravity flow from said plumbing fixtures to at least one of said collecting tanks;
a vacuum receiver tank;
means for establishing a subatmospheric pressure within said vacuum receiver tank;
a vacuum conduit connecting each of said collecting tanks to said vacuum receiver tank for conveying sewage by vacuum induced plug flow from each of said collecting tanks to said vacuum receiver tank, said vacuum conduit including valve means located adjacent each of said collecting tanks for controlling the passage of sewage from the collecting tank to said vacuum receiver tank;
means spaced along the length of said vacuum conduit for admitting air into said vacuum conduit to assist in the conveyance of sewage through said vacuum conduit to said vacuum receiver tank; and
means for opening the valve means associated with each of said collecting tanks for a period of time sufficient to substantially empty the collecting tank of sewage and to thereafter admit a volume of air through the valve means to propel the sewage in the collecting tank by vacuum induced plug flow from the collecting tank through said vacuum conduit toward said vacuum receiver tank.

17. The system of claim 16 including means for periodically causing said air admitting means to admit air into said vacuum conduit.

18. The system of claim 16 including:
a positive pressure ejector associated with said vacuum receiver tank;
transfer means for transferring sewage from said vacuum receiver tank to said positive pressure ejector;
means for introducing air at a superatmospheric pressure into said positive pressure ejector;
outlet conduit means connected to said positive pressure ejector and including second valve means for controlling the passage of sewage therethrough;
means for establishing a subatmospheric pressure within said outlet conduit means; and
means for opening said second valve means for a period of time sufficient to eject substantially all of the sewage from said positive pressure ejector and to admit a volume of air at a superatmospheric pressure through said second valve means into said outlet conduit means in order to propel said sewage therethrough by vacuum induced plug flow.

19. The system of claim 16 including volume sensing means for sensing the accumulation of a predetermined volume of sewage in said collecting tanks, said valve opening means being responsive to said collecting tank volume sensing means.

20. The system of claim 16 wherein said vacuum conduit includes a plurality of plug reformers, said plug reformers having means for imparting rotation to the plug of sewage as it is propelled therefrom through said vacuum conduit.

21. An underground collecting tank for use in a vacuum induced plug flow sewage disposal system having:
a compartment serving as a sewage collection region, said sewage collection region being defined by upstanding substantially planar side walls disposed at an angle to each other not greater than about 90° to provide self-cleaning action as the tank is emptied;
means for admitting air to the upper portion of said region;
a sewage inlet conduit in fluid communication with said region;
a sewage outlet vacuum line conduit in fluid communication with said region, said outlet conduit being disposed adjacent the junction of said side walls;
normally closed valve means for controlling the passage of sewage from said region through said outlet conduit; and
means for opening said valve means for a period of time sufficient to substantially empty said collection region of sewage and to admit a volume of air into said outlet conduit behind the sewage to propel the sewage through said outlet conduit by vacuum induced plug flow.

22. The collecting tank of claim 21 including means for sensing the pressure in said sewage outlet conduit and for disabling said valve means opening means if the pressure in said outlet conduit exceeds a predetermined limit.

23. The collecting tank of claim 21 including sensing means for sensing the accumulation of a predetermined volume of sewage in said collection region, said valve means opening means being responsive to said sensing means.

24. The collecting tank of claim 21 including means for periodically activating said valve means opening means.

25. The collecting tank of claim 21 wherein said means for admitting air to the upper portion of said collection region includes a one-way valve.

26. The collecting tank of claim 21 wherein
said means for admitting air to the upper portion of said sewage collection region includes a one-way valve;
said sewage inlet conduit communicates with said collection region in the lower portion thereof;
said sewage outlet conduit is disposed on the side of said collection region away from said sewage inlet conduit whereby the emptying of said region increases the scouring of said walls;
said collecting tank is provided with a second compartment;
said sewage outlet conduit passes through said second compartment;
said valve means is located in said second compartment; and
said second compartment is provided with an aperture in the top thereof, said aperture being sufficient size to admit an adult human therethrough into said second compartment for servicing said valve means.

27. The collecting tank of claim 26 including:
a reversible electric motor for opening and closing said valve means;
means for sensing the fully opened and fully closed positions of said valve means;
means for detecting a first predetermined volume of sewage in said collection region;
means for detecting a second predetermined volume of sewage in said collection region less than said first predetermined volume of sewage in said collection region; and means, located in a control box in said second compartment, for controlling the energization of said motor which includes means responsive to the detection of said first predetermined volume of sewage for energizing said electric motor to open said valve means, and means responsive to the detection of said second predetermined volume of sewage and to said means for sensing the fully closed position of said valve means for energizing said electric motor to close said valve means.

28. Apparatus for controlling from a remote station the introduction of sewage from a plurality of collecting tanks into a vacuum line conduit, said sewage being conveyed therethrough by vacuum induced plug flow, comprising a remote station including switch means; and a plurality of collecting tanks spaced along the length of a vacuum line conduit, each of said tanks having:
   a vacuum valve communicating with said vacuum conduit;
   reversible electric motor means for controlling the position of said vacuum valve;
   a source of electric power; and
   circuit means responsive to said switch means for selectively connecting said source to said motor to control the direction of rotation thereof.

29. Apparatus for forming a plug of sewage in agglomerate form comprising a hollow tubular member adapted to be connected into a sewage soil pipe, said member having a generally helical configuration with the axis of the helix being substantially parallel to the axis of the soil pipe into which said tubular member is connected and with the diameter of the helix formed by said tubular member being not less than about twice the diameter of said soil pipe, whereby sewage in agglomerate form setting in the lower portion of the helix may be compacted into plug form and rotation imparted to the plug as the plug is propelled through said soil pipe by a pressure differential existing on opposite sides of the plug.

30. The apparatus of claim 29 wherein the axis of the helix is coaxial with said soil pipe.

31. The apparatus of claim 30 wherein said member has a generally helical configuration of multiple turns.

32. The apparatus of claim 29 wherein the axis of the helix is disposed below the axis of said soil pipe.

33. The apparatus of claim 32 wherein said member has a generally helical configuration of multiple turns.

34. A method for conveying sewage by vacuum induced plug flow involving the interposition of a volume of air between plugs of sewage, the method utilizing: a source of sewage interconnected, through a collecting line conduit, with a sewage collection region having a volume large relative to the rate of production of sewage, a vacuum receiver tank located in a position remote from the collection region and intermittently communicating with the collection region by a vacuum line conduit, and an intermittently operable vacuum valve, the method comprising:
   passing the sewage from the sewage source by gravity flow through the collecting line conduit into the sewage collection region;
   emptying the sewage collection region into the vacuum line conduit by opening the vacuum valve;
   maintaining the vacuum valve in an open position for a period of time sufficient to substantially empty the sewage collection region and to admit a volume of air through the valve into the vacuum line conduit behind the sewage to propel, by vacuum induced plug flow, the sewage from the collection region through the vacuum line conduit toward the vacuum receiver tank;
   passing an additional amount of sewage from the sewage source by gravity flow through the collecting line conduit into the sewage collection region;
   with the first mentioned volume of air maintained in the vacuum line conduit, repeating the step of emptying the sewage collection region into the vacuum line conduit by opening the vacuum valve; and
   repeating the step of maintaining the vacuum valve in an open position for a period of time sufficient to substantially empty the sewage collection region and to admit a volume of air through the valve into the vacuum line conduit behind the sewage to propel, by vacuum induced plug flow, the sewage from the collection region through the vacuum line conduit toward the vacuum receiver tank.

35. A system for conveying sewage comprising:
   a source of sewage;
   a sewage collection region having a volume large relative to the rate of production of sewage, for accumulating sewage therein over a period of time;
   collecting line conduit means for conveying sewage from said source to said collection region by gravity flow;
   a vacuum receiver tank located in a position remote from said collection region; and
   means for conveying sewage from said collection region to said vacuum receiver tank by vacuum induced plug flow and comprising:
      vacuum line conduit means for intermittently providing communication between said collection region and said vacuum receiver tank, and
      vacuum valve means intermittently maintainable in an open position for a period of time sufficient to substantially empty said sewage collection region and to admit a volume of air through said vacuum valve means into said vacuum line conduit means behind the sewage to propel, by vacuum induced plug flow, the sewage from said collection region through said vacuum line conduit means toward said vacuum receiver tank.

36. The system of claim 35 wherein said means for conveying sewage from said collection region to said vacuum receiver tank by vacuum induced plug flow further comprises at least one plug reformer in said vacuum line conduit means and including means for imparting rotation to the sewage plug as the sewage is propelled from said plug reformer.

37. The method of emptying a sewage collecting tank into a vacuum induced plug flow sewerage system comprising the steps of:
   providing a sewage collecting tank substantially filled with a compressible fluid and having: a sewage outlet vacuum line conduit with a normally closed valve, an air vent with a one-way valve means into the tank, and a sewage inlet conduit having one-way valve means into the tank;
   establishing a subatmospheric pressure in the outlet vacuum line conduit;
   introducing a volume of sewage into the collecting tank through the sewage inlet conduit thereby compressing the compressible fluid in the tank;
   opening the valve in the outlet vacuum line conduit to initiate the ejection of the sewage from the tank through the outlet vacuum line conduit by the pressure differential existing in the outlet conduit and in the tank; and
   introducing air at atmospheric pressure into the tank through the air vent as the pressure in the tank reaches a subatmospheric pressure thereby maintaining a pressure differential between the outlet conduit and the tank until the tank is emptied.

38. A method for conveying sewage by vacuum induced plug flow involving the interposition of a volume of air between plugs of sewage, the method utilizing: a source of sewage interconnected, through a collecting line conduit, with a sewage collecting tank having a volume large relative to the rate of production of sewage, a vacu-

27 um receiver tank located in a position remote from the collecting tank and intermittently communicating with the collecting tank by a vacuum line conduit, and an intermittently operable vacuum valve, the method comprising:

passing the sewage from the sewage source through the collecting line conduit into the sewage collecting tank;

emptying the sewage collecting tank into the vacuum line conduit by opening the vacuum valve;

intermittently and repeatedly maintaining the vacuum valve in an open position for periods of time sufficient to substantially empty the sewage collecting tank and to admit a volume of air through the valve into the vacuum line conduit behind the sewage to propel, by vacuum induced plug flow, the sewage from the collecting tank through the vacuum line conduit toward the vacuum receiver tank.

39. The method of claim 34 including the steps of providing at least one plug reformer in the vacuum line conduit between the sewage collection region and the vacuum receiver tank, and introducing air, at a pressure at least as great as the atmospheric pressure, into the vacuum line conduit at spaced intervals along the length thereof.

40. A method for conveying sewage by vacuum induced plug flow involving the interposition of a volume of air between plugs of sewage, the method utilizing: a source of sewage interconnected through a collecting line conduit with a sewage collection region, a vacuum source located in a position remote from the collection region and intermittently communicating with the collection region by a vacuum line conduit, and an intermittently operable vacuum valve, the method comprising:

passing sewage from the sewage source through the collection line conduit to the sewage collection region;

drawing sewage collected in the collection region into the vacuum line conduit through the vacuum valve by opening the vacuum valve;

interposing a volume of air into the vacuum line conduit, behind sewage drawn into the vacuum line conduit through the vacuum valve, to propel, by vacuum induced plug flow, the sewage through the vacuum line conduit toward the vacuum source;

passing an additional amount of sewage from the sewage source through the collecting line conduit to the sewage collection region;

with the first mentioned volume of air maintained in the vacuum line conduit, repeating the step of drawing sewage collected in the collection region into the vacuum line conduit through the vacuum valve by opening the vacuum valve; and repeating the step of interposing a volume of air into the vacuum line conduit, behind sewage drawn into the vacuum line conduit through the vacuum valve, to propel, by vacuum induced plug flow, the sewage through the vacuum line conduit toward the vacuum source.

41. The method of claim 40 wherein the steps of passing sewage from the sewage source through the collecting line conduit to the sewage collection region comprise passing the sewage by gravity flow.

42. The method of claim 40 wherein the steps of drawing sewage and interposing a volume of air into the vacuum line conduit comprise maintaining the vacuum valve in an open position for a period of time sufficient to substantially empty the sewage collection region and to admit a volume of air through the valve into the vacuum line conduit behind the sewage.

43. The method of claim 40 including the steps of providing at least one plug reformer in the vacuum line conduit between the sewage collection region and the vacuum source, and intoducing air, at a pressure at least as great as the atmospheric pressure, into the vacuum line conduit at spaced intervals along the length thereof.

44. The method of claim 41 wherein the steps of drawing sewage and interposing a volume of air into the

28 vacuum line conduit comprise maintaining the vacuum valve in an open position for a period of time sufficient to substantially empty the sewage collection region and to admit a volume of air through the valve into the vacuum line conduit behind the sewage.

45. The method of claim 41 including the steps of providing at least one plug reformer in the vacuum line conduit between the sewage collection region and the vacuum source, and introducing air, at a pressure at least as great as the atmospheric pressure, into the vacuum line conduit at spaced intervals along the length thereof.

46. The method of claim 41 wherein the step of passing the sewage from the sewage source through the collecting line conduit to the sewage collection region comprises passing the sewage to a collection region having a volume large relative to the rate of production of sewage.

47. A system for conveying sewage comprising:
a source of sewage;
a sewage collection region for accumulating sewage therein over a period of time;
collecting line conduit means for conveying sewage from said source to said collection region;
a vacuum receiver tank located in a position remote from said collection region; and
means for conveying sewage from said collection region to said vacuum receiver tank by vacuum induced plug flow and comprising:
vacuum line conduit means for intermittently providing communication between said collection region and said vacuum receiver tank,
vacuum valve means intermittently maintainable in an open position for a period of time sufficient to draw sewage from said sewage collection region through said vacuum valve means into said vacuum line conduit means,
air introduction means for interposing a volume of air into the vacuum line conduit, behind sewage drawn into the vacuum line conduit through the vacuum valve, to propel, by vacuum induced plug flow, the sewage through said vacuum line conduit means toward said vacuum receiver tank, and
said air introduction means including means spaced along the length of said vacuum line conduit for admitting air into said vacuum line conduit.

48. The system of claim 47 wherein the collecting line conduit means includes means for conveying sewage from said source to said collection region by gravity flow.

References Cited

UNITED STATES PATENTS

| | | |
|---|---|---|
| 235,910 | 12/1880 | Shone. |
| 316,567 | 4/1885 | Pierson. |
| 377,681 | 2/1888 | Le Marquand. |
| 382,188 | 5/1888 | Pitt. |
| 424,196 | 3/1890 | Hallock. |
| 482,439 | 9/1892 | Liernur. |
| 1,492,171 | 4/1924 | Jennings. |
| 1,779,319 | 10/1930 | Jennings. |
| 1,997,801 | 4/1935 | Lockhart. |
| 2,163,506 | 6/1939 | Tucker. |
| 2,315,824 | 4/1943 | Sweeny. |
| 2,438,245 | 3/1948 | Gregg. |
| 2,530,722 | 11/1950 | Petrie. |
| 2,868,589 | 1/1959 | Schmidt et al. |
| 3,115,148 | 12/1963 | Liljendahl. |
| 3,118,391 | 1/1964 | Ciabattari. |
| 3,181,553 | 5/1965 | Liljendahl. |
| 3,211,167 | 10/1965 | Clift et al. |
| 3,239,849 | 3/1966 | Liljendahl. |
| 3,410,222 | 11/1968 | Swanton. |

(Other references on following page)

FOREIGN PATENTS

| | | |
|---|---|---|
| 390,117 | 3/1933 | Great Britain. |
| 608,448 | 9/1948 | Great Britain. |
| 680,154 | 10/1952 | Great Britain. |
| 382,683 | 11/1932 | Great Britain. |
| 453,455 | 9/1936 | Great Britain. |
| 768,073 | 2/1957 | Great Britain. |
| 915,937 | 1/1963 | Great Britain. |
| 1,143,624 | 2/1969 | Great Britain. |
| 833,402 | 2/1970 | Canada. |

MICHAEL ROGERS, Primary Examiner

U.S. Cl. X.R.

4—77; 137—209, 236; 210—109, 143, 170